United States Patent [19]
Takahara et al.

[11] Patent Number: 5,566,148
[45] Date of Patent: Oct. 15, 1996

[54] OPTICAL DISK TRACKING SYSTEM FOR SEARCHING A TARGET TRACK BASED ON A TABLE OF COMPENSATION REFERENCE VELOCITY

[75] Inventors: Tamane Takahara, Tokyo; Akihiro Kasahara, Chiba-ken, both of Japan

[73] Assignee: Kabushiki Kaisha Toshiba, Kawasaki, Japan

[21] Appl. No.: 364,721

[22] Filed: Dec. 27, 1994

[30] Foreign Application Priority Data

Dec. 27, 1993 [JP] Japan ................................. 5-332739
Dec. 27, 1993 [JP] Japan ................................. 5-332740

[51] Int. Cl.⁶ .................................................. G11B 17/22
[52] U.S. Cl. ........................ 369/32; 360/78.07; 369/44.25
[58] Field of Search ................................ 369/32, 44.28, 369/44.29, 44.27, 44.35, 44.25, 44.32; 360/78.04, 78.06, 77.02, 78.07

[56] References Cited

U.S. PATENT DOCUMENTS

| | | | |
|---|---|---|---|
| 4,591,933 | 5/1986 | Quackenbush | 360/78.07 |
| 4,622,604 | 11/1986 | Hasimoto et al. | 360/78.07 |
| 5,033,037 | 7/1991 | Yanagi | 369/32 |
| 5,117,410 | 5/1992 | Akiyama | 369/44.28 |
| 5,164,931 | 11/1992 | Yamaguchi et al. | 369/32 |
| 5,301,174 | 4/1994 | Matoba et al. | 369/44.28 |
| 5,305,161 | 4/1994 | Giovanetti et al. | 360/78.06 |
| 5,398,221 | 3/1995 | Ogawa | 369/32 |
| 5,428,590 | 6/1995 | Ogino | 369/32 |

FOREIGN PATENT DOCUMENTS

| | | |
|---|---|---|
| 0408392A2 | 7/1990 | European Pat. Off. . |
| 0464992 | 1/1992 | European Pat. Off. . |
| 363975 | 3/1991 | Japan ................ 369/32 |

OTHER PUBLICATIONS

Patent Abstracts of Japan, vol. 13, No. 303 (P-896), Jul. 12, 1989, JP-A-01-076574, Mar. 22, 1989.

*Primary Examiner*—Tan Dinh
*Attorney, Agent, or Firm*—Oblon, Spivak, McClelland, Maier & Neustadt, P.C.

[57] ABSTRACT

When a optical head is moved towards a appointed track, a reference velocity is read out from reference velocity calculation data in accordance with the number of remaining tracks latched in a track counter circuit. Using the reference velocity calculation data, a compensated reference velocity is calculated from the read out reference velocity. A linear motor control circuit is controlled on the basis of the compensated reference velocity. Thereby, the velocity of the optical head is controlled. In addition, when the optical head is moved towards the appointed track, it is determined whether the optical head is in an acceleration operation mode or in a deceleration operation mode. If the optical head is in the acceleration operation mode, the velocity is controlled by using the reference velocity. If the optical head is in the deceleration operation mode, the velocity is controlled by using the compensated reference velocity.

29 Claims, 23 Drawing Sheets

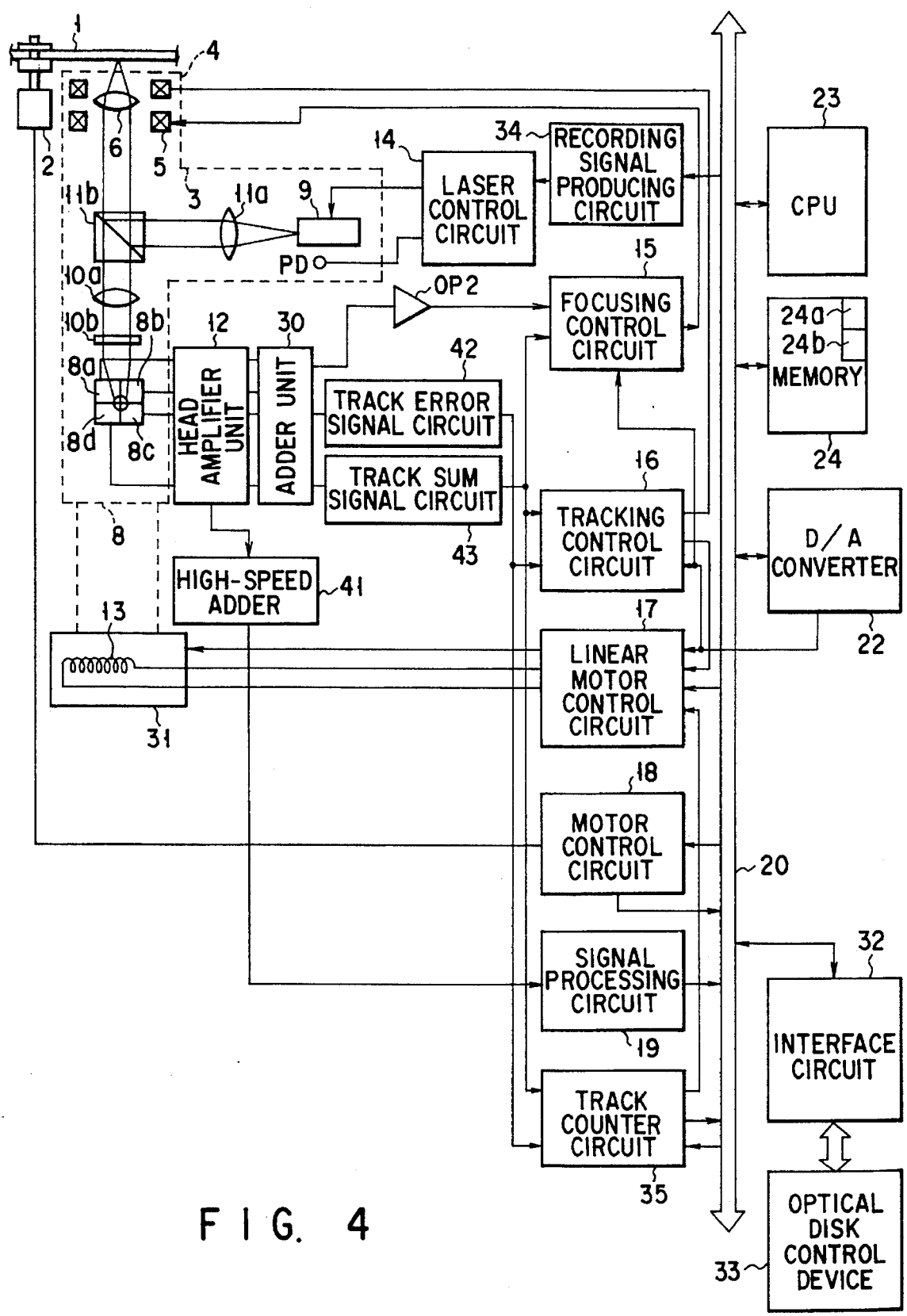
F I G. 4

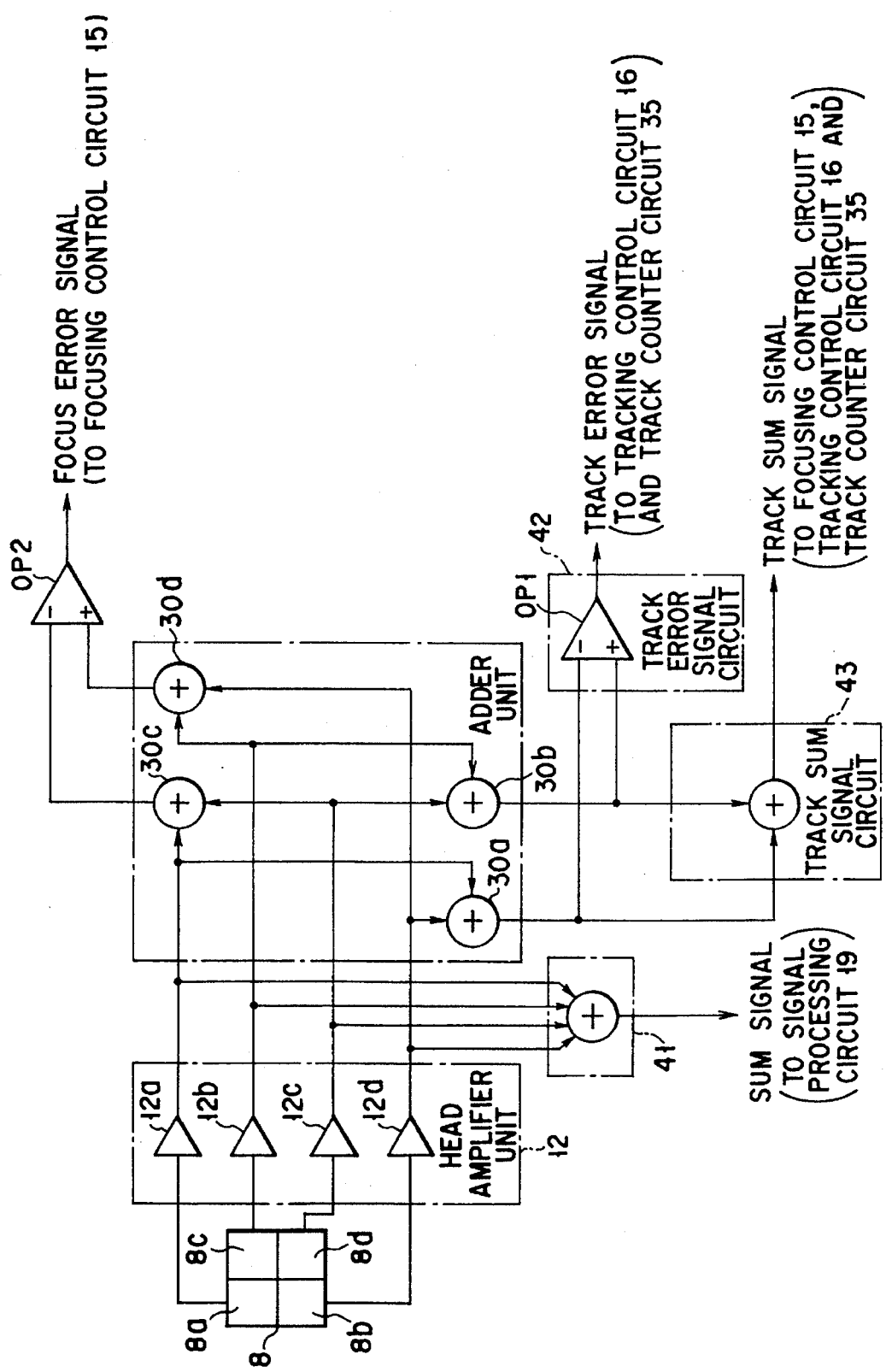
F I G. 5

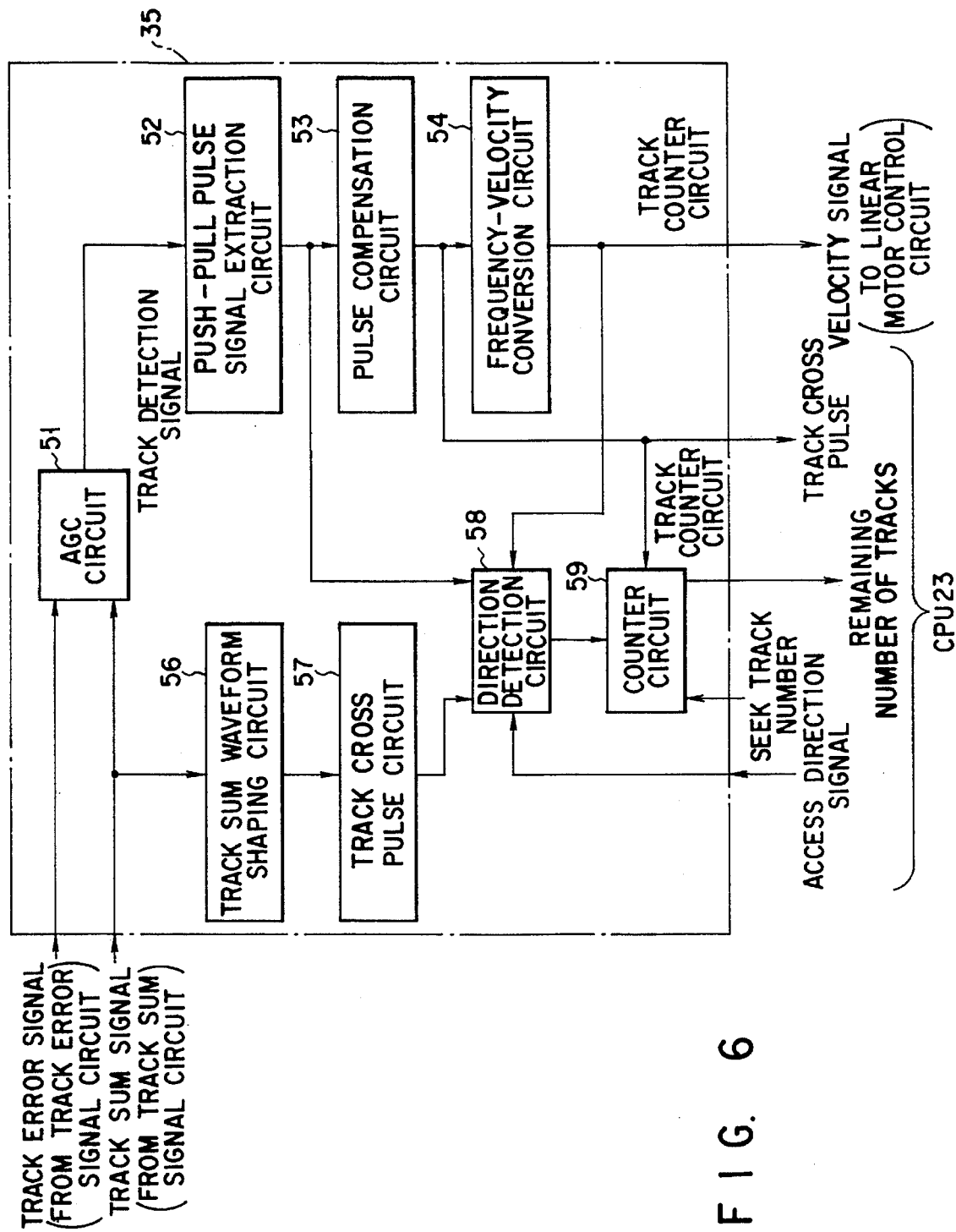
F I G. 6

| REMAINING NUMBER OF TRACKS | REFERENCE VELOCITY (m/s) |
|---|---|
| 0 | 0 |
| | 0.015 |
| 10 | 0.047 |
| 45 | 0.100 |
| 101 | 0.150 |
| 179 | 0.200 |

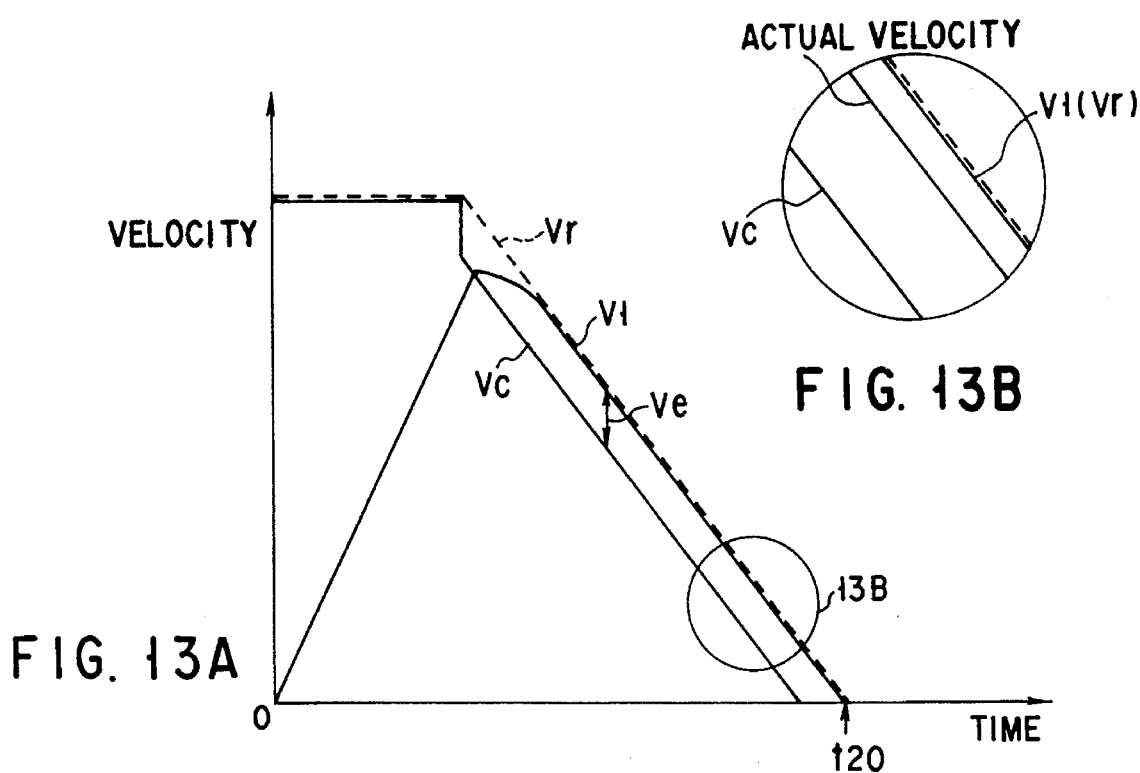
FIG. 13A
FIG. 13B
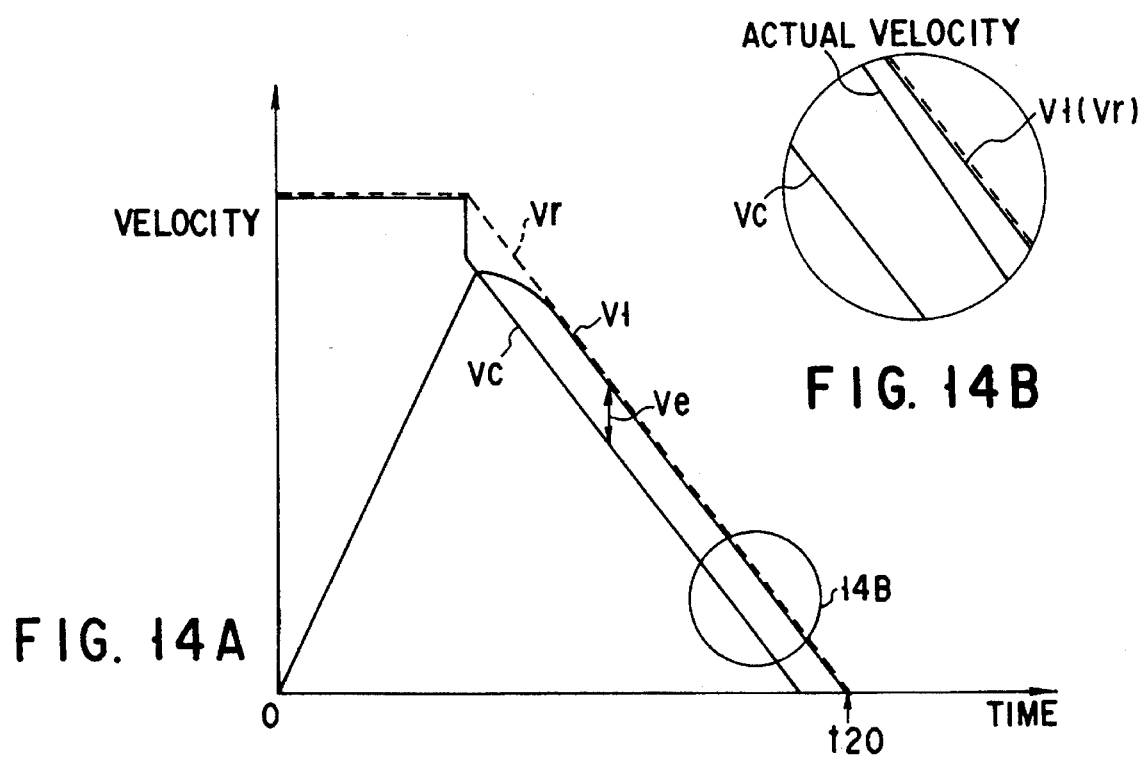
FIG. 14A
FIG. 14B

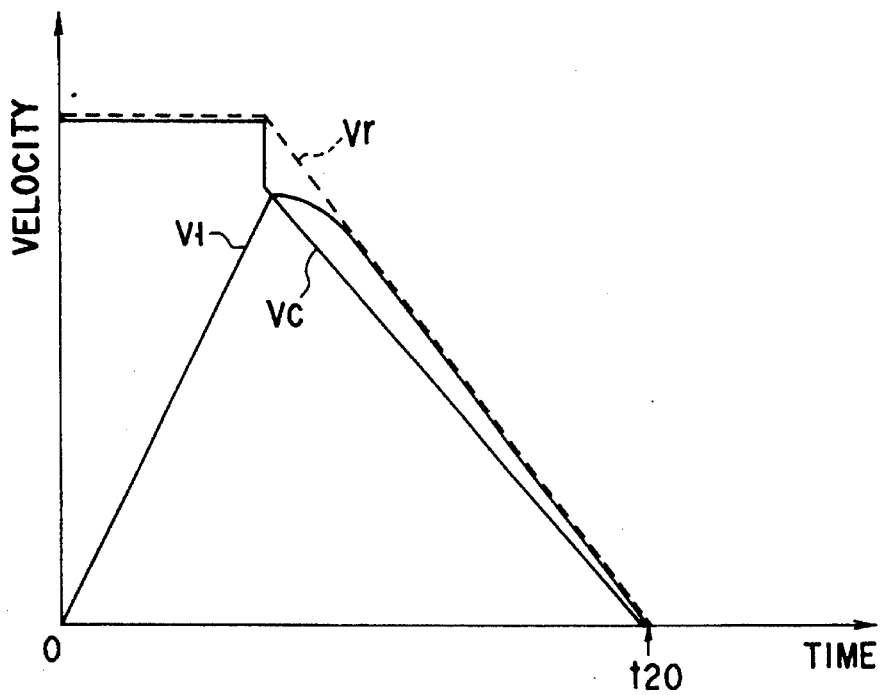
F I G. 19
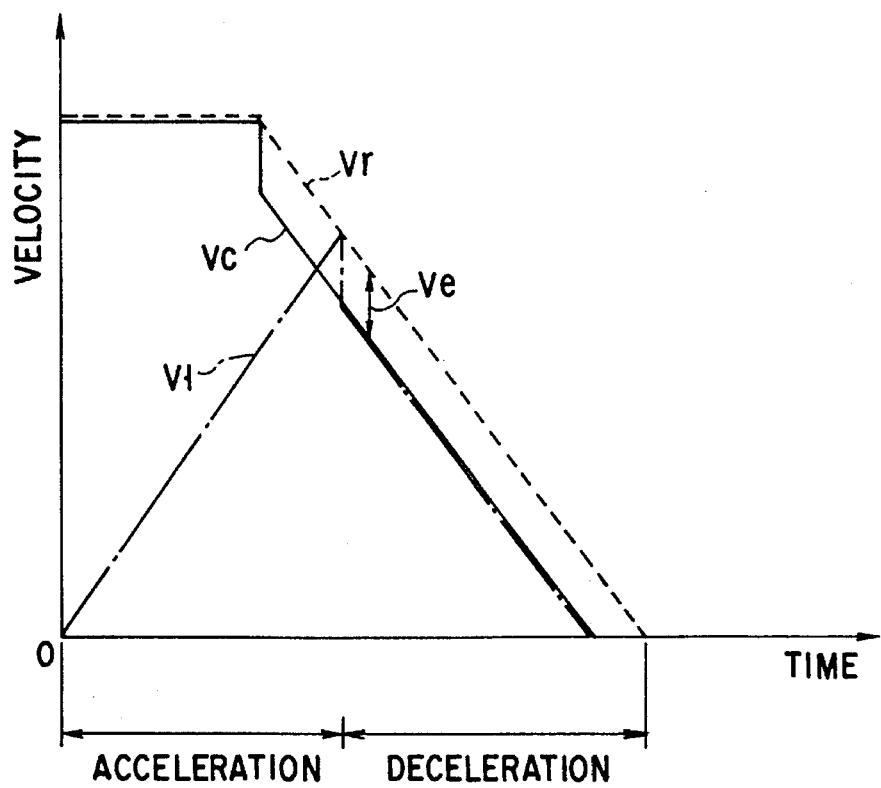
F I G. 20

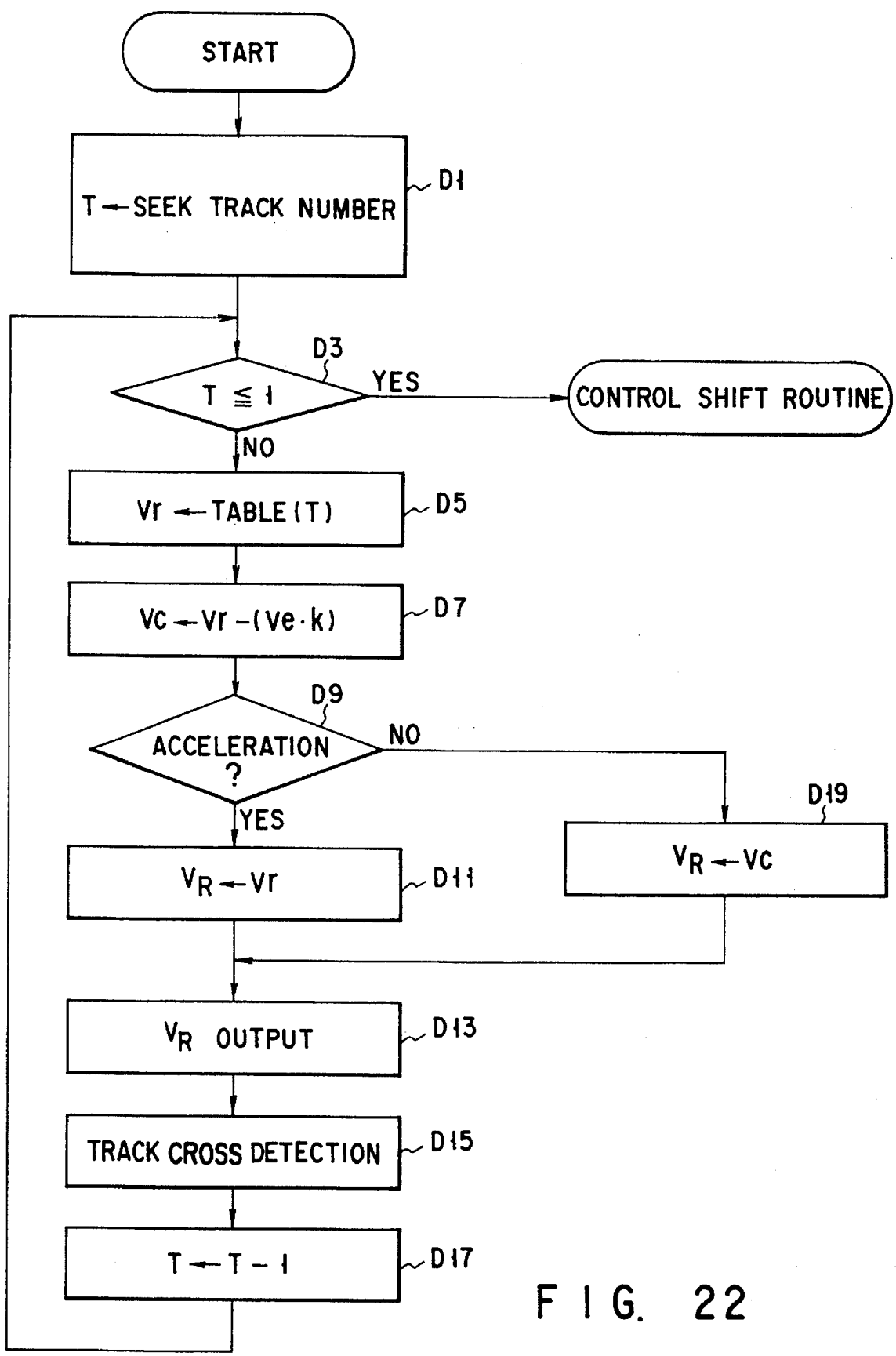
F I G. 22

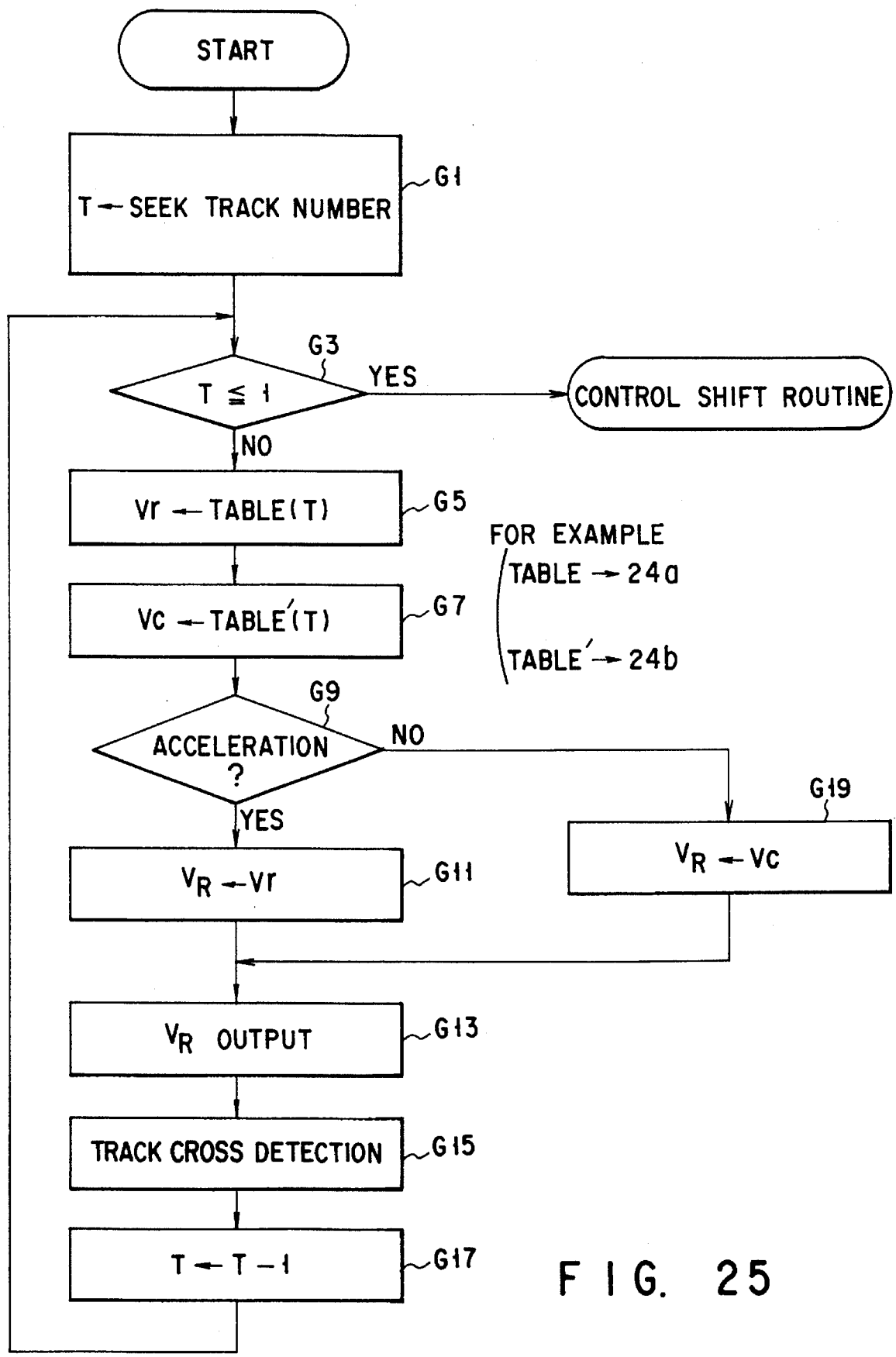
F I G. 25

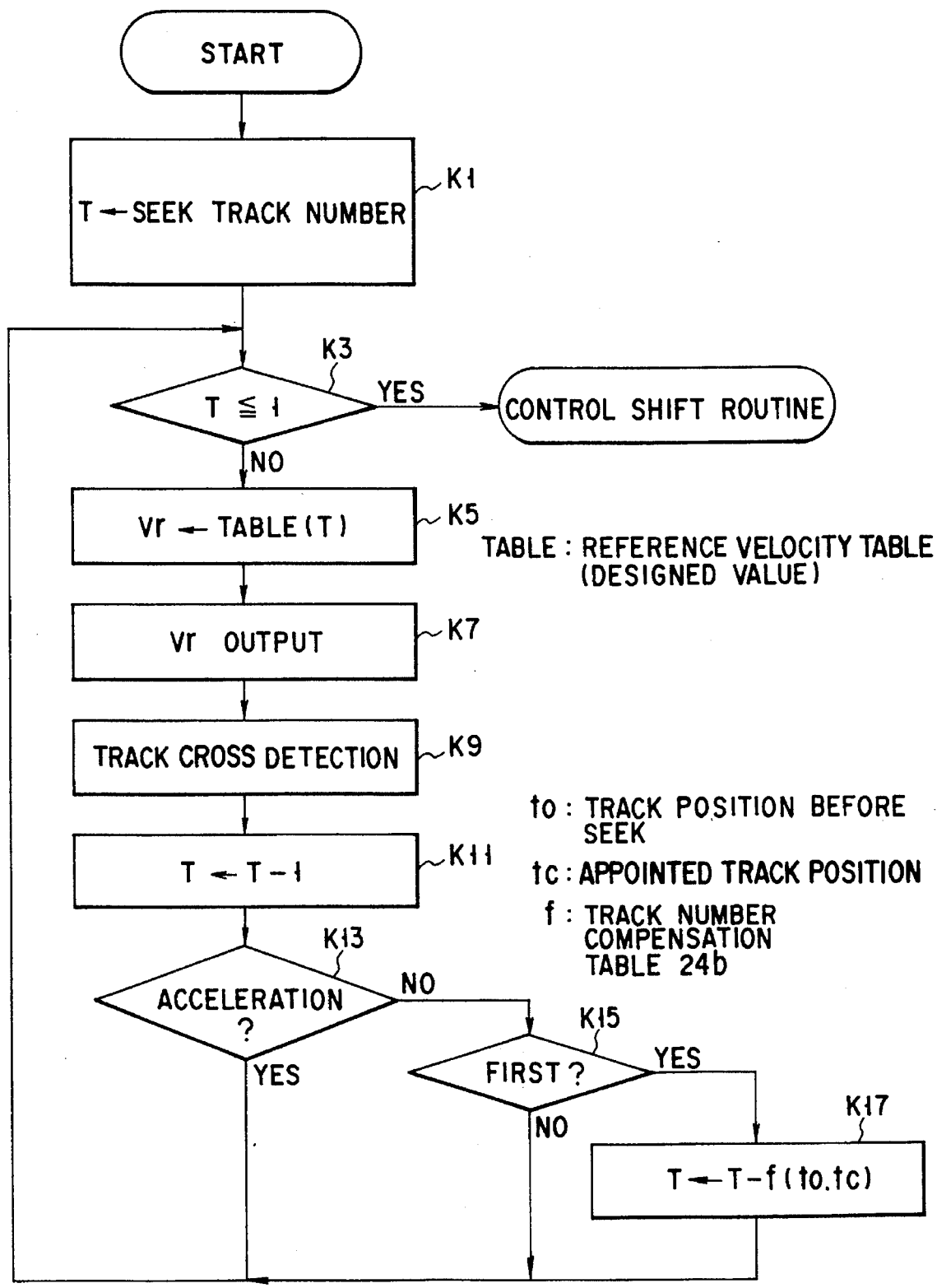
F I G. 30

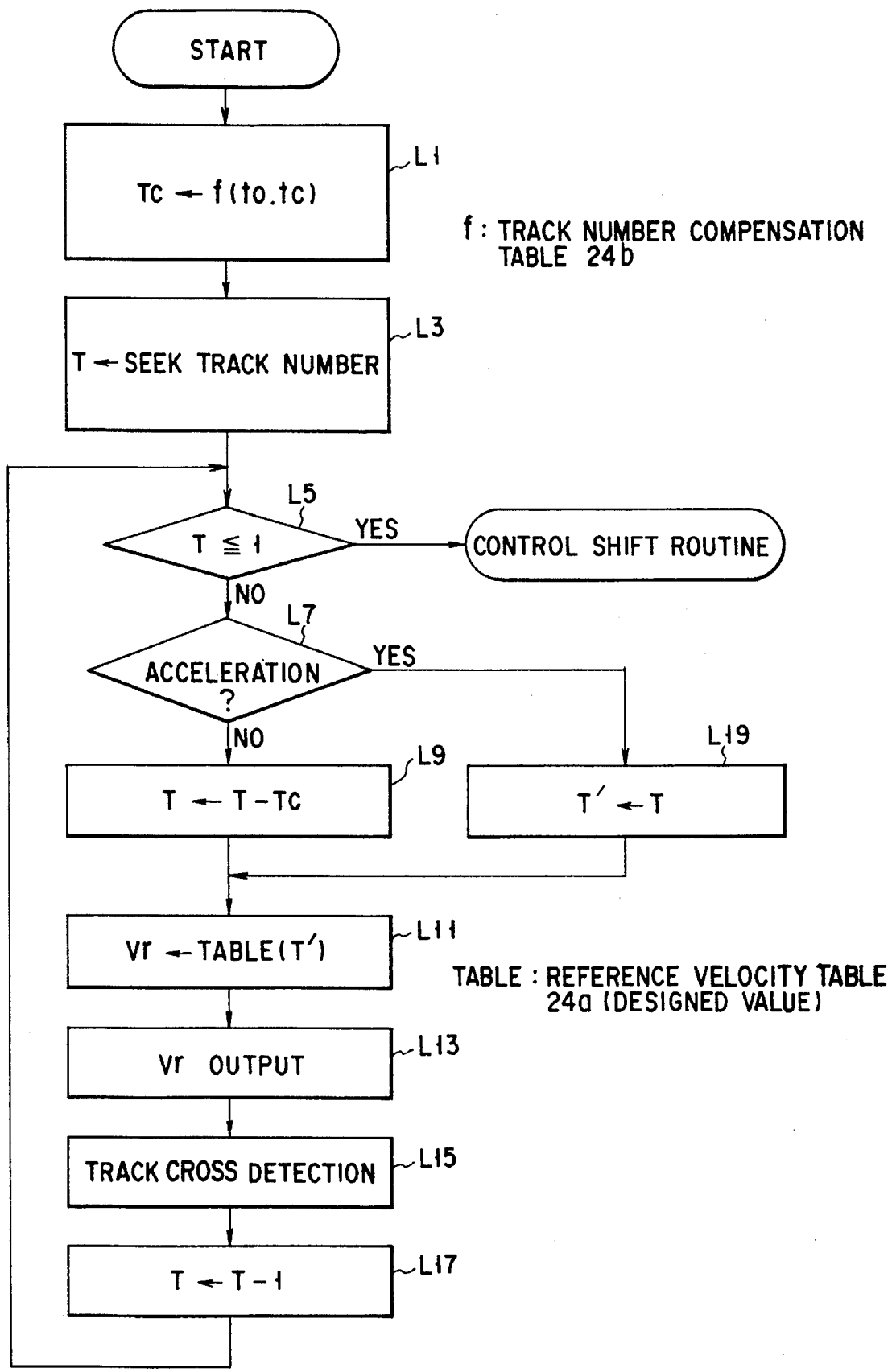
F I G. 31

OPTICAL DISK TRACKING SYSTEM FOR SEARCHING A TARGET TRACK BASED ON A TABLE OF COMPENSATION REFERENCE VELOCITY

BACKGROUND OF THE INVENTION

1. Field of the Invention

The present invention relates generally to an information recording system for recording/reproducing information on/from an information recording medium having recording tracks, and more particularly to an information recording system in which a velocity control process is performed to position a head onto an appointed track in accordance with optimal reference velocity information.

2. Description of the Related Art

Information processing apparatuses such as optical disk apparatuses have conventionally been used, in which a laser beam emitted from a laser diode mounted on an optical head is used to record information on an optical disk (information recording medium) having recording tracks or to reproduce information recorded on the optical disk.

In this type of optical disk apparatus, the optical head is moved in a seek operation by a linear motor (or an actuator) in the radial direction of the optical disk, i.e. in a direction crossing the tracks, so that the radiation point of a laser beam is shifted to a appointed track.

In this seek operation of the optical head, when the optical head has approached the appointed track, the velocity of the optical head is controlled by a reference velocity signal for deceleration. The reference velocity signal is generated so that a pull in to the tracking operation is performed at the time the optical head has reached the appointed track. On the basis of the reference velocity signal, the optical disk apparatus controls the velocity of the optical head within a range of velocity which depends on the system of the optical disk apparatus and at which the pull in to the tracking control can be executed. In this optical disk apparatus, the velocity of the optical disk is controlled within the range of velocity, which depends on the apparatus and at which the tracking control can be executed, in accordance with the predetermined reference velocity signal (see Jap. Pat. Appln. KOKAI Publication No. (Hei)1-271921). FIG. 1 is a graph showing an example of the reference velocity for controlling the velocity of the optical head. As shown in FIG. 1, the velocity of the optical head is designed to decrease at a predetermined rate as the optical head approaches the appointed track. The designed value of the velocity is set as a reference velocity. The reference velocity is set to decrease the velocity of the optical head so that the pull in the tracking operation can be executed at the time the optical head has reached the appointed track.

However, in the optical disk apparatus in which the above-mentioned velocity control is performed, the control range of the velocity control system is limited, and there occurs a deviation of velocity due to a velocity control system, as shown in FIG. 2. FIG. 2 shows an example of the velocity control system applied to the optical disk apparatus. In FIG. 2, an optical disk 90 and an optical head 91 are shown schematically. A signal processing unit 92 receives velocity deviation data, position deviation data, etc. and converts these data items in a predetermined data format. On the basis of the converted data output from the signal processing unit 92, a velocity detector 93 detects the velocity of the optical head, and a number-of-remaining-tracks calculator 94 calculates the number of tracks remaining between the track at which the head is located at present and the appointed track. A reference velocity table 95 reads out a designed reference velocity associated with the calculated number of remaining tracks output from the number-of-remaining-tracks calculator 94. A gain controller/power amplifier 96 controls the velocity of the optical head 91 on the basis of the velocity of the optical head 91 detected by the velocity detector 93 and the designed reference velocity read out from the reference velocity table 95. In this velocity control system, a velocity deviation depending on the system will occur, as mentioned above.

FIG. 3 is a graph showing a designed reference velocity 97 at the time of deceleration, an actual movement velocity 98 of the optical head, and a velocity deviation 99. In the conventional optical disk apparatus, when the tracking control is executed in accordance with the reference velocity, the velocity of the optical head does not sufficiently decrease because of the velocity deviation, and consequently the pull in to the tracking control may fail. In such a case, the optical disk apparatus needs to read out the current position data (address) of the optical head and restart the operation of making the head seek the appointed track, or to restart the operation of making the head seek the appointed track after returning the head to a predetermined position. The failure of the pull in to the tracking control will increase the time of movement (seek time) of the head to the appointed track and will decrease the efficiency of the information processing of the information processing apparatus.

In another type of optical disk apparatus, when the reference velocity set at the design time has decreased to a predetermined value, the apparatus waits for a predetermined time period until the actual velocity of the optical head falls within the range in which the pull in to the tracking control can be performed. After the wait, the pull in to the tracking control is performed. In this apparatus, however, the wait time is required until the actual velocity of the head falls within the range in which the pull in to the tracking control can be performed, and the seek time increases.

SUMMARY OF THE INVENTION

A first object of the present invention is to provide an information processing system such as an optical disk system, wherein a pull in to a tracking operation can be prevented from failing by decreasing the velocity of an optical head when the head has reached a appointed track.

A second object of the invention is to provide an information processing system capable of enhancing an information processing efficiency by quickly and exactly controlling the velocity of the optical head to the appointed track.

According to a first aspect of the present invention, there is provided an information processing system with a recording medium including recording tracks, for reading/writing information on the recording medium, the system comprising: condensing means for condensing light onto the recording medium; moving means for moving the condensing means in a direction crossing the recording tracks; velocity detection means for detecting the velocity of the condensing means moved by the moving means; storage means for storing a position address of the condensing means before the condensing means is moved; input means for inputting a target position address of the condensing means; updating means for calculating the remaining number of tracks between the position address stored in the storage means and the target position address input by the input means, and updating the remaining number of tracks in accordance with movement of the condensing means crossing the recording tracks; compensation means for outputting a compensated reference velocity obtained by compensating in a predetermined manner a reference velocity of the condensing means corresponding to the remaining number of tracks; and control means for controlling the moving means such that the condensing means is located at the target position address, on the basis of the compensated reference velocity and the velocity detected by the velocity detection means.

In this system, the compensation means compensates the reference velocity corresponding to the remaining number of tracks by using a product of a steady state error depending on the information processing system and a predetermined compensation coefficient, and the compensation coefficient is 0.75 or more and is less than 1.

According to a second aspect of the invention, there is provided an information processing system with a recording medium including recording tracks, for reading/writing information on the recording medium, the system comprising: condensing means for condensing light on the recording medium; moving means for moving the condensing means in a direction crossing the recording tracks; velocity detection means for detecting the velocity of the condensing means moved by the moving means; storage means for storing a position address of the condensing means before the condensing means is moved; input means for inputting a target position address of the condensing means; determination means for determining a switching timing for switching an acceleration operation to a deceleration operation of the condensing means moved by the moving means, and outputting an operation signal in accordance with the result of determination; track number compensation means for calculating the remaining number of tracks between the position address stored in the storage means and the target position address input by the input means, and outputting a control track number obtained by compensating the remaining number of tracks on the basis of the operation signal; control velocity output means for obtaining a control velocity corresponding to the control track number; and control means for controlling the moving means such that the condensing means is located at the target position address, on the basis of the control velocity and the velocity detected by the velocity detection means.

According to a third aspect of the invention, there is provided a movement control method in an information processing system for reading/writing information on a recording medium, the system comprising the recording medium including recording tracks, condensing means for condensing light on the recording medium, moving means for moving the condensing means in a direction crossing the recording tracks, velocity detection means for detecting the velocity of the condensing means moved by the moving means, storage means for storing a position address of the condensing means before the condensing means is moved, and input means for inputting a target position address of the condensing means, the method comprising the steps of: a) calculating the remaining number of tracks between the position address stored in the storage means and the target position address input by the input means, and updating the remaining number of tracks in accordance with the crossing of the condensing means over the recording tracks while the condensing means is being moved; b) outputting compensated reference velocity obtained by compensating a reference velocity corresponding to the remaining number of tracks; and c) controlling the moving means such that the condensing means is situated at the target position address, on the basis of the compensated reference velocity and the velocity detected by the velocity detection means.

According to a fourth aspect of the invention, there is provided a movement control method in an information processing system for reading/writing information on a recording medium, the system comprising the recording medium including recording tracks, condensing means for condensing light on the recording medium, moving means for moving the condensing means in a direction crossing the recording tracks, velocity detection means for detecting the velocity of the condensing means moved by the moving means, a memory for storing a position address of the condensing means before the condensing means is moved, and input means for inputting a target position address of the condensing means, the method comprising the steps of: a) determining a switching timing for switching an acceleration operation to a deceleration operation of the condensing means moved by the moving means, and outputting an operation signal corresponding to a result of the determination; b) calculating the remaining number of tracks between the position address stored in the storage means and the target position address input by the input means, and outputting a control track number obtained by compensating the remaining number of tracks on the basis of the operation signal; c) obtaining a control velocity corresponding to the remaining number of tracks; and d) controlling the moving means such that the condensing means is located at the target position address, on the basis of the control velocity and the velocity detected by the velocity detection means.

According to the above information processing systems and methods, the velocity of the optical head can be exactly decreased at the time the head has reached the appointed track. Specifically, even if the control band of the velocity control system is limited, the optical head can be moved at a velocity close to the designed value. Thus, the pull in to the tracking control operation can be surely performed at the time the head has reached the appointed track. Therefore, the velocity of the optical head can be increased and the time of movement of the head can be remarkably reduced.

Furthermore, since the velocity of seek (movement) of the optical head can be increased with use of the velocity control system, the write/read of information on the optical disk can be performed exactly and the performance of the optical disk system can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram showing a circuit structure of an information processing apparatus according to a first embodiment of the present invention;

FIG. 5 is a circuit diagram for illustrating a photodetector, a head amplifier unit and an adder according to the first embodiment as shown in FIG. 4;

FIG. 6 is a block diagram showing the structure of a track counter circuit according to the first embodiment as shown in FIG. 4;

FIGS. 13A and 13B are graphs showing examples of a reference velocity at the time of deceleration control, a detection velocity, and an actual velocity of the optical head in the first embodiment as shown in FIG. 4;

FIGS. 14A and 14B are graphs showing examples of a reference velocity at the time of deceleration control, a detection velocity, and an actual velocity of the optical head in the first embodiment as shown in FIG. 4;

FIG. 19 is a graph showing examples of a reference velocity at the time of deceleration control, a detection velocity, and an actual velocity of the optical head in the second embodiment;

FIG. 20 is a graph showing the relationship between a difference between the actual velocity and detected velocity of the optical head, and the actual velocity of the optical head, in a third embodiment of the optical disk apparatus of the invention;

FIG. 22 is a flow chart illustrating the operation of a second example of the third embodiment of the invention;

FIG. 25 is a flow chart illustrating the operation of a fifth example of the third embodiment of the invention;

FIG. 30 is a flow chart illustrating the operation of a third example of the fourth embodiment of the invention; and FIG. 31 is a flow chart illustrating the operation of a fourth example of the fourth embodiment of the invention.

DETAILED DESCRIPTION OF THE PREFERRED EMBODIMENTS

Figure 1:
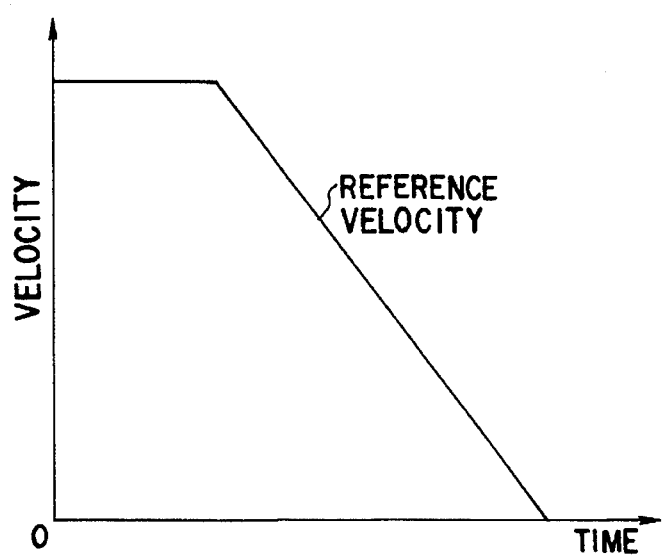
FIG. 1 is a graph showing a reference velocity of a conventional optical disk apparatus.
Figure 2:
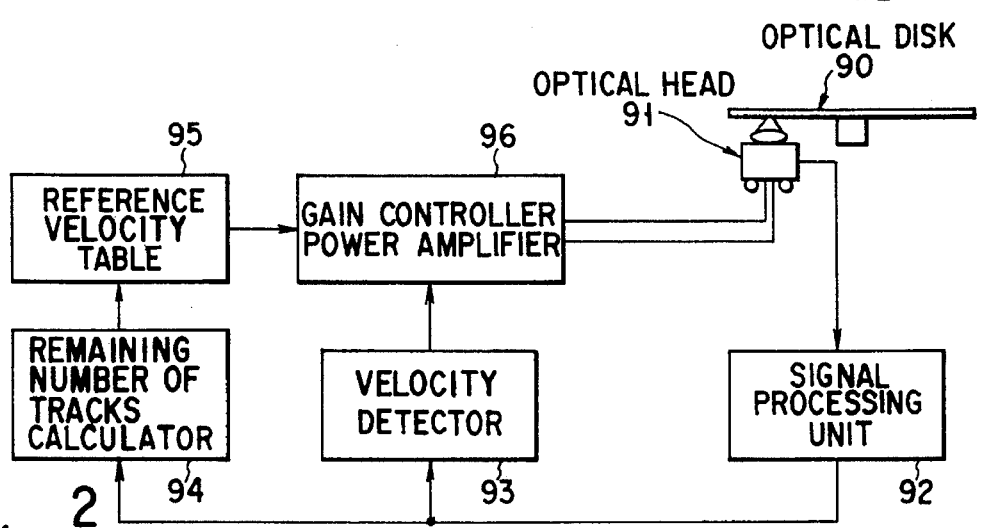
FIG. 2 is a block diagram showing an example of a velocity control system as applied to the conventional optical disk apparatus.
Figure 3:
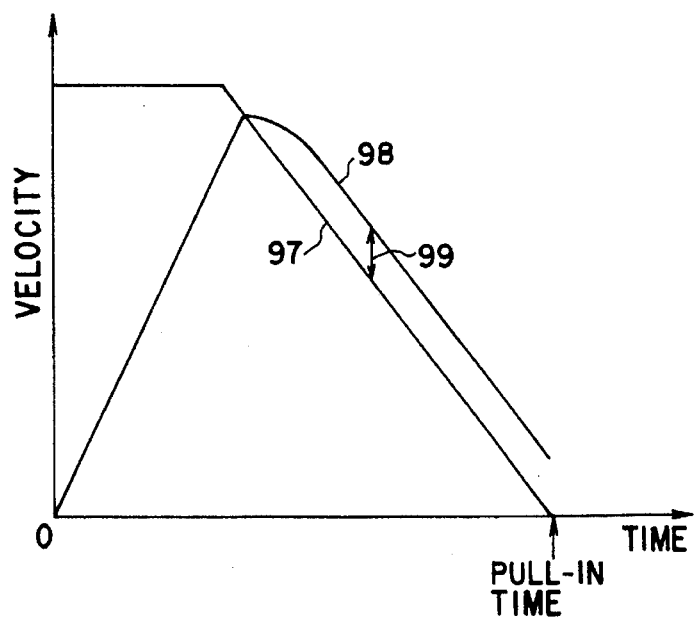
FIG. 3 is a graph showing a reference velocity and the actual velocity of an optical head, for illustrating a velocity deviation of the conventional optical disk apparatus.

Embodiments of the present invention will now be described with reference to the accompanying drawings.

FIG. 4 shows the structure of an optical disk apparatus according to a first embodiment of the information processing apparatus of the present invention. Recording tracks (bit strings or grooves) are formed spirally or concentrically on the surface of an optical disk (information recording medium) 1. The optical disk 1 is rotated by a spindle motor 2.

Recording and reproduction of information on the optical disk 1 is performed by an optical head 3 provided below the optical disk 1.

The optical disk 1 is provided with a recording layer in which pits are formed by holes. Alternatively, the disk 1 may be replaced with disks having a recording layer or a recording multi-layer to which phase variation is applied. Furthermore, a magnetooptical disk may be used. When these types of disks are used, the structures of the optical head, etc. may be modified by adopting prior art.

An objective lens 6 is movably supported in the optical head 3 by means of a wire, a plate spring, a slider, or other devices (not shown). A permanent magnet (not shown) is attached to the optical head 3. The objective lens 6 is moved by a driving coil 5 in the focusing direction (in the direction of the optical axis of the objective lens 6) and also moved by a driving coil 4 in the tracking direction (in the direction perpendicular to the optical axis of the objective lens 6).

A laser beam emitted from a laser diode 9, which is driven by a laser control circuit 14, is radiated on the optical disk 1 via a collimator lens 11a, a half prism 11b and the objective lens 6. A reflection beam from the optical disk 1 is transmitted to a photodetector 8 via the objective lens 6, the half prism 11b, a condensing lens 10a and a cylindrical lens 10b.

The photodetector 8 comprises four photodetector cells 8a, 8b, 8c and 8d.

As is shown in FIG. 5, a head amplifier unit 12 comprises amplifiers 12a, 12b, 12c and 12d, and an adder unit 30 comprises adders 30a, 30b, 30c and 30d. An output signal from the photodetector cell 8a of the photodetector 8 is supplied to one terminal of each of the adders 30a and 30c via the amplifier 12a. An output signal from the photodetector cell 8c of the photodetector 8 is supplied to one terminal of each of the adders 30b and 30d via the amplifier 12b. An output signal from the photodetector cell 8d is supplied to the other terminal of each of the adders 30b and 30c via the amplifier 12c. An output signal from the photodetector cell 8b of the photodetector 8 is supplied to the other terminal of each of the adders 30a and 30d via the amplifier 12d.

The output signals from the photodetector cells 8a, 8b, 8c and 8d of the photodetector 8 are supplied to a high-velocity adder 41 via the amplifiers 12a, 12b, 12c and 12d.

The output signal from the adder 30a is supplied to an inverting input terminal of a differential amplifier OP1 included in a tracking error signal circuit 42, and the output signal from the adder 30b is supplied to a non-inverting input terminal of the differential amplifier OP1. Thus, the differential amplifier OP1 supplies a tracking error signal (a push-pull (PP) signal) corresponding to a difference between the values of outputs from the adders 30a and 30b to a tracking control circuit 16 and a track counter circuit 35.

The output signals from the adders 30a and 30b are supplied to a track sum signal circuit 43 constituted by an adder. Thus, the track sum signal circuit 43 supplies a track sum signal corresponding to a sum of the outputs of the adders 30a and 30b to a focusing control circuit 15, the tracking control circuit 16 and the track counter circuit 35. The track sum signal (track cross (TC) signal) output from the track sum signal circuit 43 has a waveform reflecting a difference in reflectance on the surface of the optical disk 1 and diffraction of light crossing the track grooves.

The tracking control circuit 16 generates a tracking drive signal on the basis of the tracking error signal supplied from the differential amplifier OP1 and the track sum signal supplied from the track sum signal circuit 43.

The track counter circuit 35 calculates the track position (current position) of the laser beam radiated on the optical disk 1, on the basis of the tracking error signal supplied from the differential amplifier OP1 and the track sum signal supplied from the track sum signal circuit 43. In addition, the track counter circuit 35 detects the relative velocity (moving velocity) between the laser beam and the optical disk 1. Data on the track position calculated by the track counter circuit 35 is output to the CPU 23, and data on the movement velocity is output to a linear motor control circuit 17. A pulse from a pulse compensation circuit 53 (described later) in the track counter circuit 35 is output to a CPU as track cross pulse.

The linear motor control circuit 17 supplies to a driving coil (conductor) 13 of a linear motor 31 (described later) a current corresponding to a voltage corresponding to the tracking error signal from the tracking control circuit 16 or a current corresponding to a difference between a reference velocity signal supplied from the CPU 23 via a D/A converter 22 and moving velocity data supplied from the track counter circuit 35.

An output signal from the adder 30c is supplied to an inversion input terminal of a differential amplifier OP2 and an output signal from the adder 30d is supplied to a non-inversion input terminal of the differential amplifier OP2. Thus, the differential amplifier OP2 supplies to the focusing control circuit 15 a signal relating to a focal point in accordance with a difference between outputs of the adders 30c and 30d. An output signal from the focusing control circuit 15 is supplied to the focusing driving coil 5 so that the laser beam is just focused on the optical disk 1 constantly.

As has been described above, the sum signal of the outputs of the photodetector cells 8a, 8b, 8c and 8d of the photodetector 8 in which the focusing and tracking has been effected, i.e. the output signal from the high-velocity adder 41 reflects the variation in reflectance of light from the bits (recording information) formed on the tracks. This signal is supplied to a signal processing circuit 19. In the signal processing circuit 19, recording information and address information (track number, sector number, etc.) is reproduced. A reproduced signal (reproduced information) reproduced by the signal processing circuit 19 is output to an optical disk control device 33 functioning as an external device via an interface circuit 32.

A recording signal producing circuit 34 is provided in a preceding stage of the laser control circuit 14 as a modulation circuit for modulating a recording signal.

This optical disk apparatus is also provided with a D/A converter 22 for effecting transmission of information among the focusing control circuit 15, tracking control circuit 16, linear motor control circuit 17 and CPU 23.

The tracking control circuit 16 is designed to move the objective lens 6 in accordance with a track jump signal supplied from the CPU 23 via the D/A converter 22, thereby shifting the laser beam by one track.

The laser control circuit 14, focusing control circuit 15, tracking control circuit 16, linear motor control circuit 17, motor control circuit 18, signal processing circuit 19, recording signal producing circuit 34 and track counter circuit 35 are controlled by the CPU 23 via a bus line 20. The CPU 23 performs predetermined control operations on the basis of programs stored in a memory 24.

As is shown in FIG. 6, the track counter circuit 35 comprises an AGC (Automatic Gain Control) circuit 51, a push-pull pulse signal extraction circuit 52, a pulse compensation circuit 53, a frequency-velocity conversion circuit 54, a track sum waveform shaping circuit 56, a track cross pulse circuit 57, a direction detection circuit 58, and a counter circuit 59.

Using the track sum signal supplied from the track sum signal circuit 43, the AGC circuit 51 eliminates a noise signal component produced due to pits, unevenness, dust, contamination, flaws, etc. on the tracks from the tracking error signal supplied from the tracking error signal circuit 42, thereby outputting a track detection signal. The track detection signal from the AGC circuit 51 is sent to the push-pull pulse signal extraction circuit 52.

The push-pull pulse signal extraction circuit 52 functions to exactly produce a one-pulse push-pull (PP) pulse for one track groove at the time of low velocity of the optical head 3, even if the track detection signal from the AGC circuit 51 is disturbed due to breakage or dust on the track groove of the optical disk 1.

The pulse compensation circuit 53 functions to exactly output a one-pulse signal for one track groove at the time of high velocity of the optical head 3, even if the spot of the laser beam from the optical head 3 falls within a breakage portion of the track groove of the optical disk 1 and the push-pull pulse cannot be output from the push-pull pulse signal extraction circuit 52.

The frequency-velocity conversion circuit 54 calculates an inverse number (1/T) of the cycle of a compensated push-pull pulse supplied from the pulse compensation circuit 53. Thereby, the conversion circuit 54 converts the cycle of the push-pull pulse to a relative velocity between the optical head 3 and optical disk 1. A velocity signal representing the relative velocity is sent to the linear motor control circuit 17.

The track sum waveform shaping circuit 56 is constituted by an upper-end detection circuit and shapes the waveform of the track sum signal sent from the track sum signal circuit 43. The track sum signal wave-shaped by the track sum waveform shaping circuit 56 is sent to the track cross pulse circuit 57.

The track cross pulse circuit 57 outputs a track cross (TC) pulse as a pulse corresponding to the groove, from the track sum signal supplied from the track sum waveform shaping circuit 56. The track cross pulse from the track cross pulse circuit 57 is output to the direction detection circuit 58.

When the direction detection circuit 58 has determined that the velocity is slow on the basis of the velocity signal from the frequency-velocity conversion circuit 54, the direction detection circuit 58 discriminates the direction of movement of the laser beam on the basis of the relationship in phase among the access direction signal supplied from the CPU 23, the push-pull pulse supplied from the push-pull pulse extraction circuit 52, and the track cross pulse supplied from the track cross pulse circuit 57. A direction signal representing the discrimination result is sent to the counter circuit 59.

At the time of start of the seek, the counter circuit 59 receives value data on the number of tracks to move from the CPU 23 via the bus 20 and latches this value data as a counter initial value. When the seek to the appointed track is started, the counter circuit 59 switches the up-count/down-count on the basis of the direction signal from the direction detection circuit 58. In the switched state, the counter circuit 59 counts up/down the count value each time the push-pull pulse from the pulse compensation circuit 53 is supplied.

While the optical head 3 is moving at low velocity, the direction of movement of the optical head 3 may be reversed with respect to the optical disk 1 owing to eccentricity of the disk 1. In this case, the up-count/down-count of the counter circuit 59 is switched by the direction signal from the direction detection circuit 58. Thereby, the counter circuit 59 can exactly count the push-pull pulses and output the number of remaining tracks to the appointed track.

Depending on the information processing system, the track cross pulse may not be detected while the optical head 3 is moving. In this case, the detection of direction may not be performed.

A detailed description of the track counter circuit 35 is omitted, since the details thereof are disclosed in Jap. Pat. Appln. KOKAI Publications Nos. (Hei)5-36095 and (Hei)5-89485.

The memory 24 is provided with a reference velocity table 24a for storing data on a reference velocity Vr corresponding to the number of remaining tracks to the target position of the optical head 3, and a compensated reference velocity calculation table 24b for calculating a compensated reference velocity (new reference velocity) Vc lower than the reference velocity Vr by a predetermined value Ve (described below).

The reference velocity will now be described. The reference velocity in the context of the present invention is a velocity which is referred to at any time to perform the pull in to the tracking operation when the optical head 3 has reached the appointed track while the head 3 is moved onto the appointed track. Since the reference velocity value is a designed value, however, no consideration is given of, e.g. a velocity deviation depending on the information processing system.

For example, the above reference velocity can be obtained by the following equations:

$$Vref(T) = \sqrt{2dtp} \times \sqrt{T} \quad T \leq T_0$$

$$Vref(T) = Vmax \quad T >$$

d: acceleration/deceleration tp: track pitch

T: remaining number of tracks to cross

To: predetermined remaining number of tracks

Figure 8:
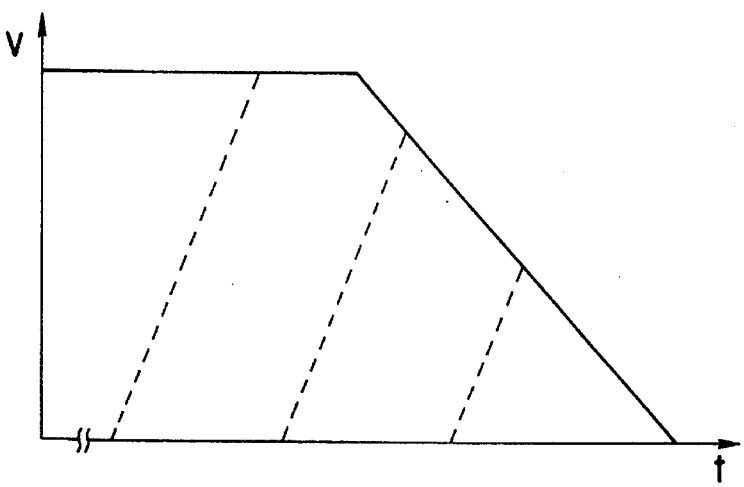
FIG. 8 is a graph showing an example of a designed value of reference velocity along the axis of ordinate and time along the axis of abscissa with respect to the first embodiment as shown in FIG. 4.
Figure 9:
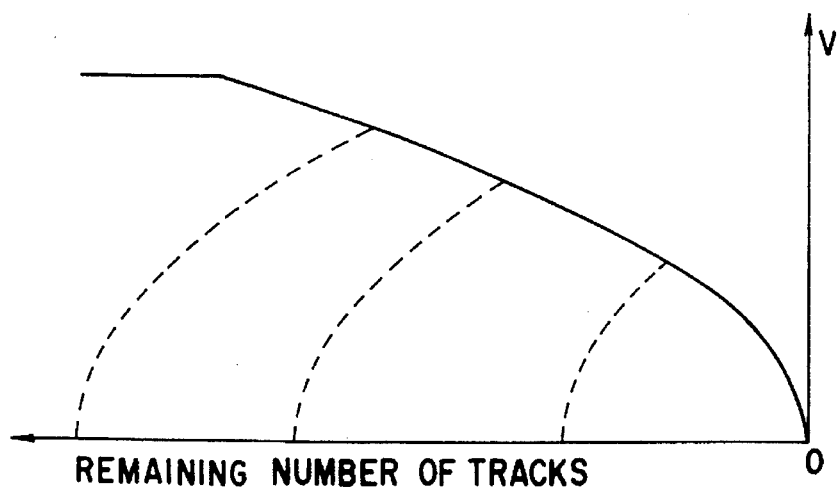
FIG. 9 is a graph showing an example of a designed value of reference velocity along the axis of ordinate and the number of remaining tracks along the axis of abscissa with respect to the first embodiment as shown in FIG. 4.
Figures 10, 11:
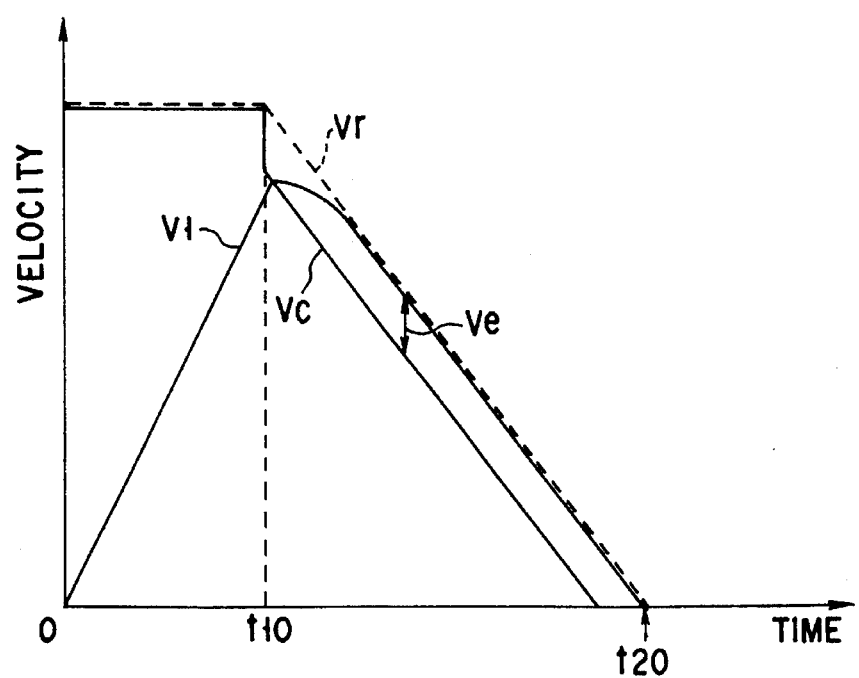
FIG. 10 shows an example of written data on a table stored in a memory in the first embodiment as shown in FIG. 4.
FIG. 11 is a graph showing a reference velocity, a compensated reference velocity and an actual velocity of the optical head in the first embodiment as shown in FIG. 4.

For example, as is shown in FIG. 8, the reference velocity is designed so as to be decreased enough to perform the pull in to the position control (tracking control) at the appointed track. The reference velocity table 24a stores reference velocities corresponding to the remaining tracks, as shown in FIGS. 9 and 10. Control can be effected at a proper reference velocity by using part of the reference velocity table in accordance with various track numbers to move (seek distances), as indicated by broken lines in FIGS. 8 and 9. Broken lines in FIG. 8 indicate boundaries between the remaining tracks, and broken lines in FIG. 9 indicate time.

Figure 7:
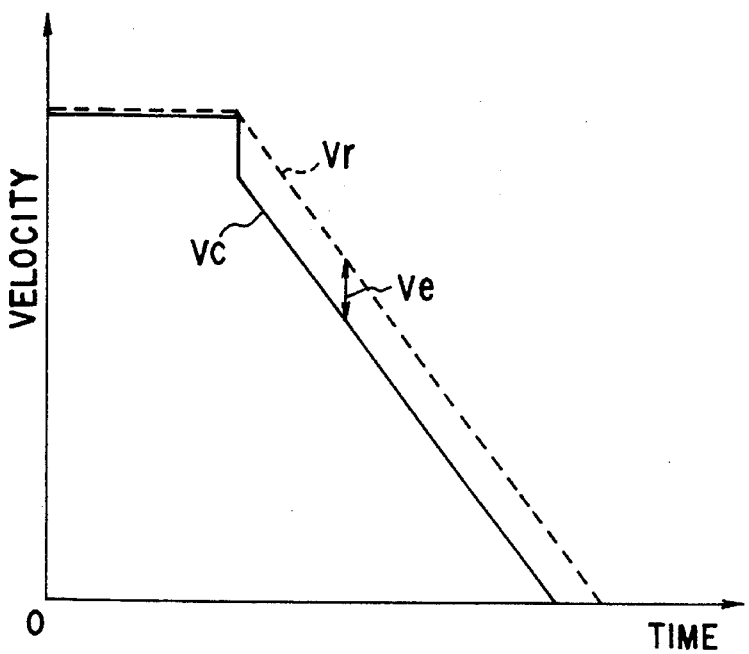
FIG. 7 is a graph showing a compensated reference velocity and a designed value of reference velocity in the first embodiment as shown in FIG. 4.

FIG. 7 shows a compensated reference velocity Vc for use in actual control in relation to the reference velocity Vr. The CPU 23 calculates a compensated reference velocity lower than the designed value by a predetermined value Ve, by using the compensated reference velocity calculation table 24b. In FIG. 7, a solid line and a broken line take the same value when the velocity is constant.

At the time of start of seek to the CPU 23, if an appointed track address of a destination of the optical head 3 is supplied from the optical disk control device 33, the CPU 23 finds a track number to move (i.e. the number of tracks over which the head moves) or a difference between the appointed track address and the current track address, and outputs the track number to move to the counter circuit 59 of the track counter circuit 35.

Each time a track cross pulse is supplied from the track counter circuit 35, the CPU 23 reads out the reference velocity Vr corresponding to the remaining track number from the reference velocity table 24a. Using the compensated reference velocity calculation table 24b, the CPU 23 calculates the compensated reference velocity Vc which is lower than the read-out reference velocity Vr by a predetermined value Ve and outputs the calculated compensated reference velocity Vc to the linear motor control circuit 17 via the D/A converter 22.

The memory 24 may be designed to store only the compensated reference velocity Vc which is lower by a predetermined value C. The compensated reference velocity Vc corresponding to the remaining track number may be read out and output to the linear motor control circuit 17 via the D/A converter 22.

During the seek operation, the linear motor control circuit 17 performs velocity control by controlling the value of current to be supplied to the linear motor 31 on the basis of the compensated reference velocity Vc and the detection velocity data supplied from the track counter circuit 35.

The predetermined value Ve will now be described.

It can be considered that the velocity control at the time of deceleration is a response to a ramp input by the velocity control system. In this case, if a transmission function of the velocity control system is G(s), a steady state error E to a unit ramp input is given by $$E = \lim_{s \to 0} 1/(s \cdot G(s))$$

Suppose that the velocity control system of the optical disk system as shown in FIG. 4 is simply referred to as a 1-type system (a control system in which an open loop transmission function has one pole at the origin). The transmission function is given by $$G(s)=2\pi fc/s$$

where fc is a control band of the velocity control system.

Accordingly, if a deceleration is d, a steady state error Ed is given by $$Ed=d/(22\pi fc)$$

Specifically, the velocity of the optical head 3 becomes higher by Ed than the reference velocity Vr stored in the reference velocity table 24a. As a result, as mentioned above, since the velocity of the optical head 3 increases by the steady state error Ed when the head 3 has reached the appointed track, the pull in to the tracking control may not be performed smoothly. Consequently, it becomes difficult to shorten the seek time and enhance the data efficiency.

In first to fourth embodiments of the optical disk system of the present invention, a value k×Ed obtained by multiplying the steady state error Ed by a compensation coefficient k is used as a predetermined value Ve, and a value lower by k×Ed is used as compensated reference velocity Vc to effect velocity control. Thereby, the actual velocity of the optical head is controlled to a value close to the designed value. The compensated reference velocity Vc is obtained by the following equation:

compensated reference velocity $Vc$ =reference velocity $Vr-(k \times Ed)$

FIG. 11 shows a compensated reference velocity Vc, a reference velocity Vr of a designed value, a predetermined value Ve, and a movement velocity V1 of optical head 3 at the time of using compensated reference velocity Vc (V1 is a velocity measured by track counter circuit 35). By referring to the compensated reference velocity Vc from the time point (t10) of start of deceleration, the actual velocity of the optical head 3 is made closer to the designed reference velocity Vr and is sufficiently reduced at a pull in time t2.

As shown in a region near a deceleration start time (t10) in FIG. 11, the deviation gradually approaches the steady state error value Ed. In the case of short movement (seek), if the predetermined value Ve is less than the steady state error value Ed, the velocity of the head 3 can be made closer to the designed reference velocity Vr.

The compensated reference velocity Vc does not take a negative valve and takes a value greater than 0. If the value obtained by subtracting predetermined value Ve from the reference velocity is a negative value, the new reference velocity is close to zero. The reason is that is general, if the value obtained by subtraction is 0 or less, the remaining number of tracks to the appointed track is 0.

The frequency-velocity conversion circuit 54 for laser beam velocity measurement calculates an inverse number (1/T) of the cycle of the compensated push-pull pulse supplied from the pulse compensation circuit 53 and converts the inverse number to a relative velocity between the optical head 3 and optical disk 1. Thus, until the next push-pull pulse is output, the velocity cannot be measured. During this time, the control is effected by using the latest measured velocity. As a result, a time delay occurs in the detection operation. Specifically, since the actual velocity of the optical head 3 varies during a time period from when a push-pull pulse has been detected to when the next push-pull pulse is detected, an error occurs between the velocity of the optical head 3 referred to in the velocity control and the actual velocity of the optical head 3. In particular, during the deceleration, a value higher than the actual velocity is used for control, as shown in FIG. 12, this influence must be considered.

During the deceleration of the seek operation, as shown in FIGS. 13A and 13B, the actual velocity of the optical head 3 lies in the range between the compensated reference velocity Vc and the measured velocity V1. In this case, if the value Ve is equal to Ed, the detection velocity coincides with the designed value. Thus, the actual velocity decreases below the designed value. As a result, for example, the actual velocity decreases excessively in a low-velocity region just before the pull in to the tracking control, and the head may move in the opposite direction owing to the influence of the eccentric velocity of the eccentricity of the disk. In this case, the seek time may increase or the seek operation may fail.

Figure 12:
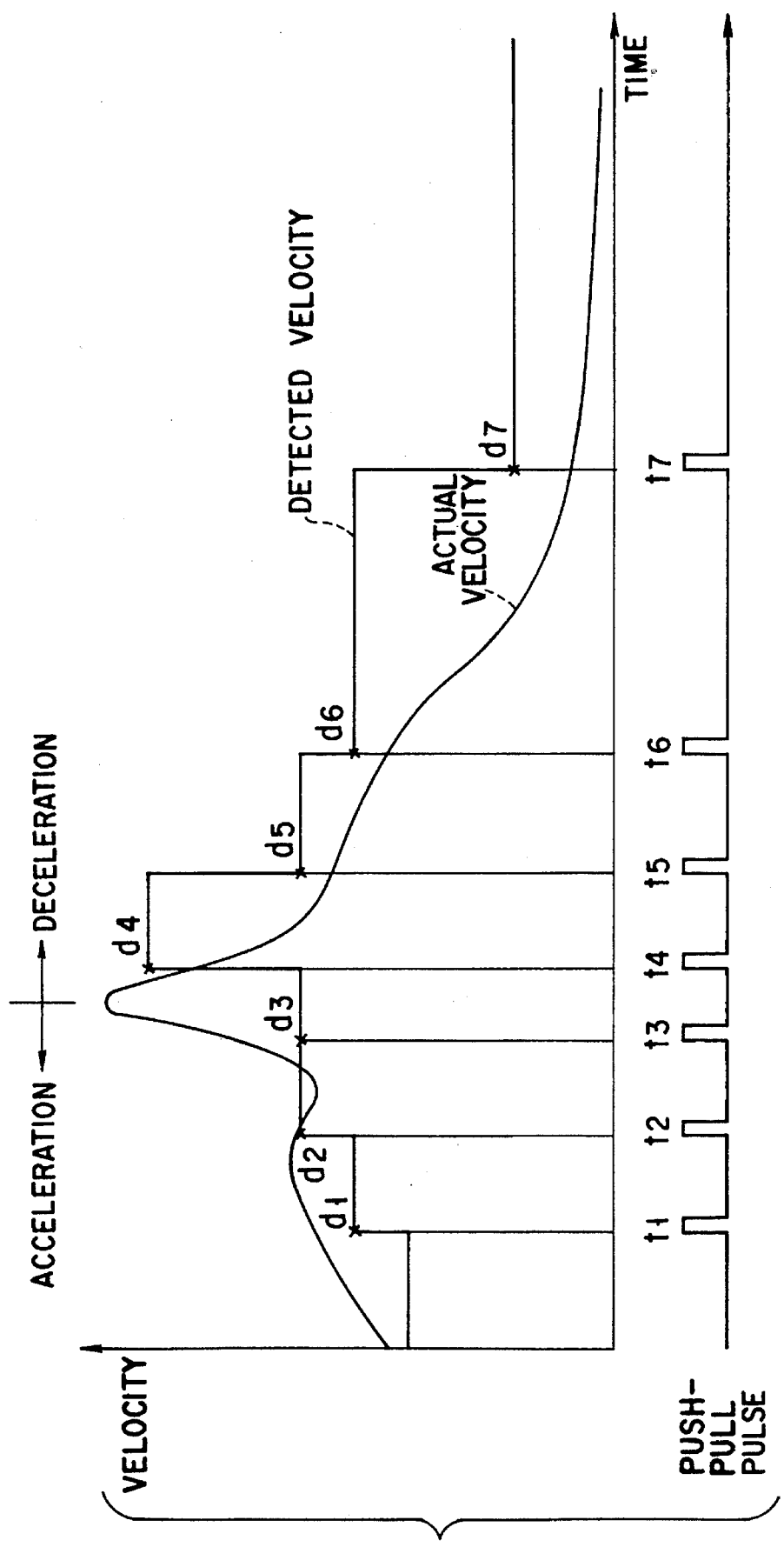
FIG. 12 is a graph showing the relationship between the actual velocity of the optical head and the detected velocity in the first embodiment as shown in FIG. 4.

As shown in FIG. 12, a value greater than the actual velocity is used for control as a measured value. As the velocity of the optical head 3 decreases, the detection delay time (detection time interval of track pulses) increases. Accordingly, at the time of deceleration, the error between the actual velocity and detection velocity increases gradually. This point, too, must be considered.

Specifically, when the actual velocity of the optical head lies between the compensated reference velocity Vc and detected velocity V1, if the value Ve is equal to Ed, an error occurs between the actual velocity and the designed value. This error decreases as the velocity of the optical head 3 decreases gradually. FIGS. 14A and 14B each illustrate this state.

Accordingly, in any case, if the value of Ve is equal to Ed, the tracking control cannot be initiated. Thus, in order to make the actual velocity closer to the designed value, it is necessary to set Ve at a value slightly lower than Ed. This is why the compensation coefficient k was introduced.

Figure 15:
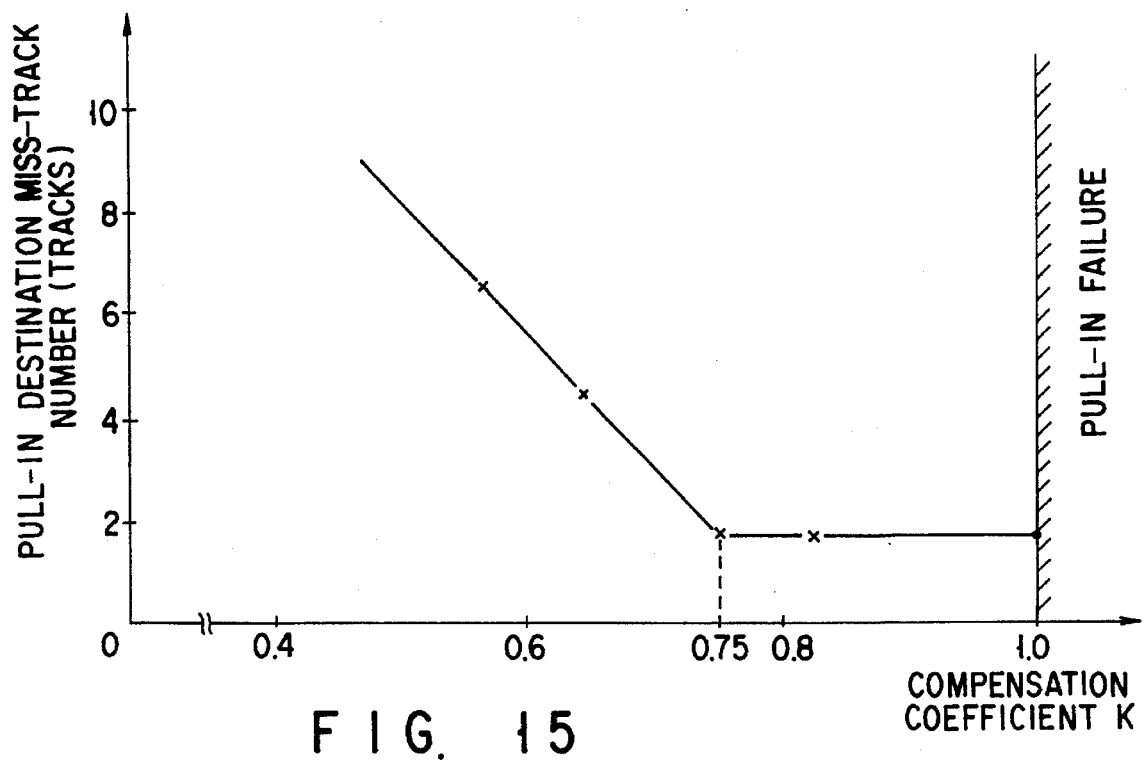
FIG. 15 is a graph showing the relationship between a compensation coefficient and a mis-track number at the time of pull in in the first embodiment as shown in FIG. 4.

FIG. 15 shows experimental data on the pull-in destination mis-track number corresponding to the compensation coefficient k. The pull-in destination mis-track number is an average value of errors between the appointed track and the pull-in destination track, which was obtained when 1024 random seek operations were performed. When k=1 (Ve= Ed), it is highly possible that the seek operation fails and the tracking control is disabled, and measurement data cannot be obtained. It is understood, from FIG. 15, that the pull-in destination mis-track number increases sharply if the compensation coefficient k decreases below 0.75. It is thus desirable in a practical level that the compensation coefficient k is 0.75 or more and less than 1.

The predetermined value Ve for calculating the compensated reference velocity Vc should not necessarily be constant, as mentioned above. The value Ve may be varied, depending on the velocity, distance of seek, position of seek, type of disk, etc.

The access (movement) operation of the optical head 3 in the above-described structure will now be described with reference to the flow chart of FIG. 16.

At first, the track address of the target position or the seek position of the optical head 3 is supplied from the optical disk control device 33 to the CPU 23 via the interface circuit 32 and bus 20. In addition, the track address representing the track at which the optical head 3 is located is supplied from the signal processing circuit 19 to the CPU 23. The track address representing the current position of the optical head 3 may be stored, where necessary, at a predetermined location in the memory 24 at the time of information recording/reproducing and may be utilized.

At the time of start of access, the CPU 23 calculates the seek track number representing the difference between the track address of the target position and the current track address. The seek track number T is stored in the counter circuit 59 as an initial value of the remaining track number (step A1).

The CPU 23 determines whether or not the remaining track number T is 1 or less. If the remaining track number is not 1 or less (NO in step A3), the reference velocity Vr corresponding to the remaining track number is read out from the reference velocity table 24a (step A5). Moreover, the CPU 23 calculates the compensated reference velocity Vc lower than the read-out reference velocity Vr by a predetermined value Ve by using the compensated reference velocity table 24b, and outputs the calculated compensated reference velocity Vc to the linear motor control circuit 17 via the D/A converter 22 (steps A7 and A9). The CPU 23 determines the direction of movement of the optical head 3 on the basis of the track address of the target position and the current track address, and outputs the results of determination to the linear motor control circuit 17 and track counter 35.

Thus, the linear motor control circuit 17 applies a voltage, which corresponds to the difference between the new reference signal Vc supplied from the CPU 23 and the detection velocity of the optical head 3 supplied from the track counter circuit 35, to the driving coil 13 of the linear motor 31. Thereby, the linear motor 31 or the optical head 3 is moved towards the target position.

Thereafter, the counter circuit 59 counts up/down the remaining track number in accordance with the track cross pulse supplied each time the laser beam from the head 3 crosses the track and the direction signal from the direction detection circuit 58 (steps A11 and A13). Following step A13, the CPU 23 returns the processing of step A3 and executes the processing of steps A5 to A13 until the remaining track number T decreases to 1 or less.

In step A3, if the remaining track number T is 1 or less (YES in step A3), the CPU 23 executes a control shift routine for initializing position control (tracking control).

In the above operation, the count up/down is performed in units of a track. However, in a track detection system wherein several tracks are detected at a time, the detected track number may be counted up/down at a time.

In the above operation, if the remaining track number T decreases to 1 or less, the control shift routine is executed. However, for example, the cross of the beam over the track may be detected more finely, and the tracking process may be executed when the remaining track number T has decreased to 0.5 or less.

After the above operation, the position control is executed, and the recording/reproducing of information is effected on the accessed track.

Figure 17:
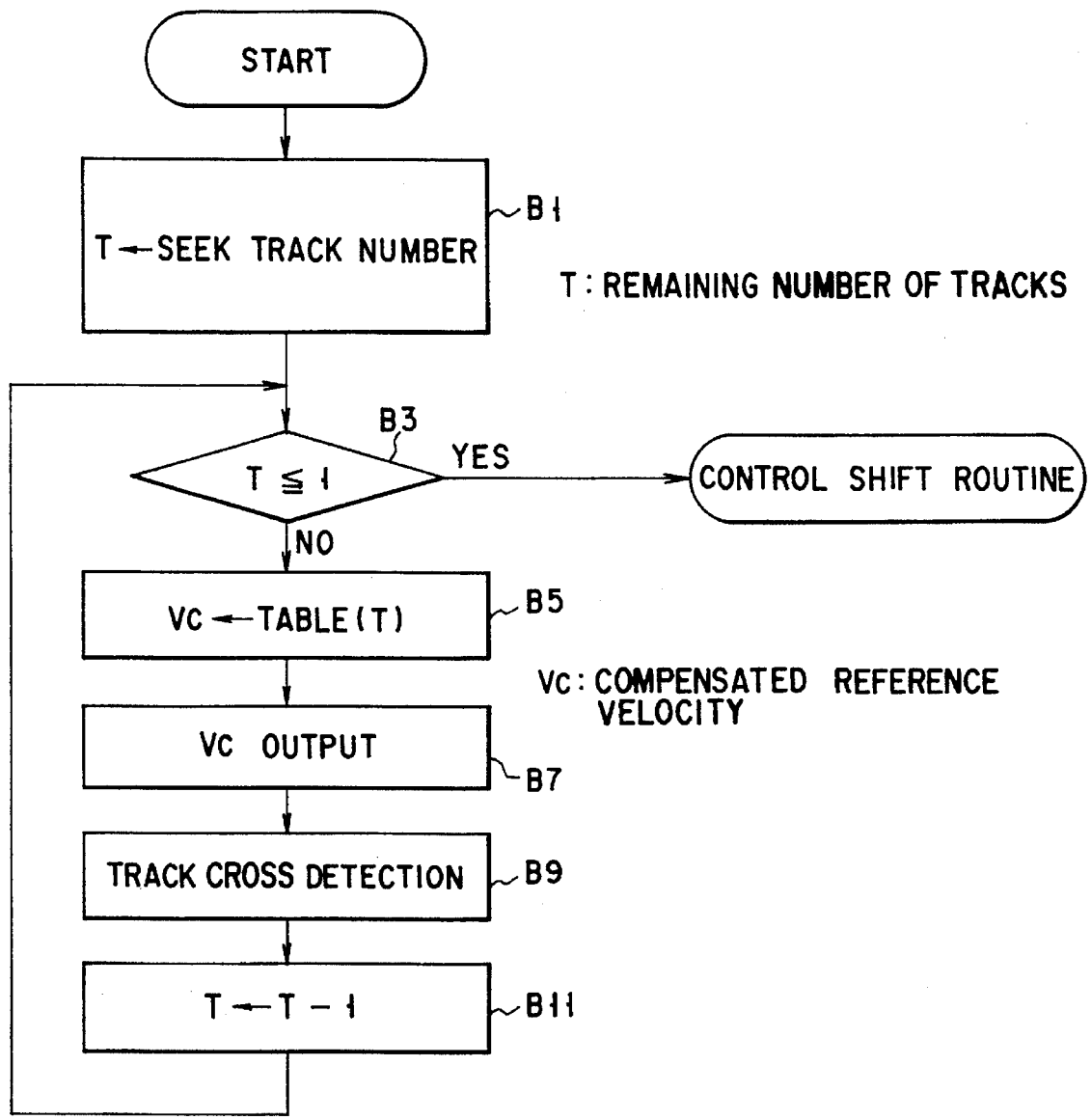
FIG. 17 is a flow chart illustrating the operation of a modification of the first embodiment as shown in FIG. 4.

Furthermore, in the above operation, the compensated reference velocity Vc is calculated by using the compensated reference velocity calculation table 24b. It is possible, however, to calculate the compensated reference velocity Vc in advance, store the compensated reference velocity Vc in the table 24a in place of the reference velocity Vr, and read out the compensated reference velocity Vc in accordance with the remaining track number. In this case, the table 24b becomes needless. FIG. 17 is a flow chart illustrating the operation in this case.

Figure 16:
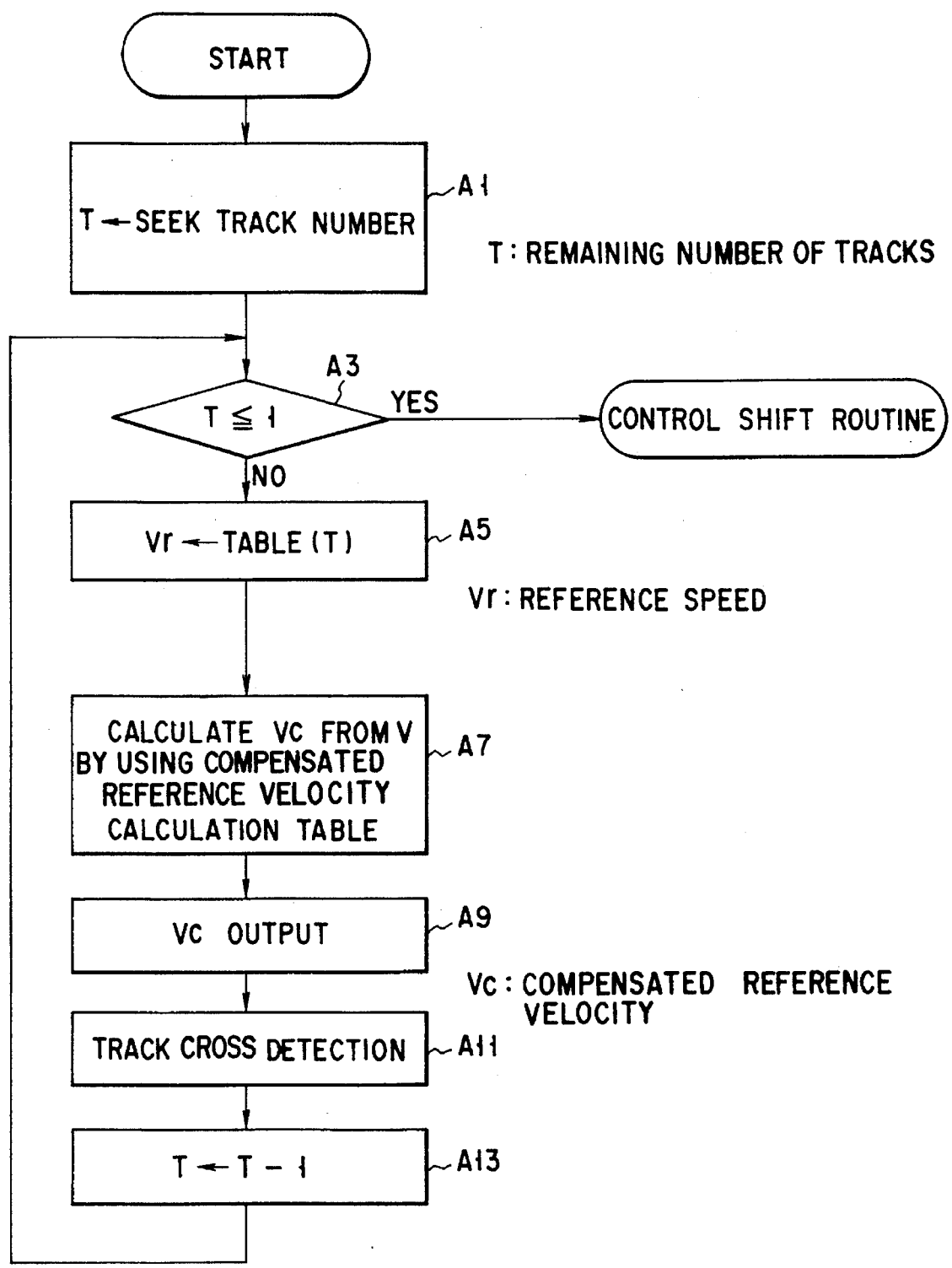
FIG. 16 is a flow chart illustrating the operation of the first embodiment as shown in FIG. 4.

The operation (steps B1 to B11) illustrated in FIG. 17 is substantially the same as that illustrated in FIG. 16, and therefore a detailed description thereof is omitted. However, the processing in steps A5 and A7 is changed in FIG. 17 to step B5 in which the compensated reference velocity Vc is read out from the table 24a. In the processing illustrated in FIG. 17, the tracking control can be effected through the control shift routine by substantially the same procedure as shown in FIG. 16.

As has been described above in detail, according to the first embodiment, the pull in to tracking control can exactly be performed on the appointed track. Thus, as compared to the prior art, the seek time of the optical head can be reduced and the data processing efficiency of the information processing apparatus for performing data recording/reproducing can be enhanced.

A second embodiment of the optical disk system of the present invention will now be described. The system construction of the second embodiment and the concept of using the reference velocity Vr, compensated reference velocity Vc and predetermined value Ve are the same as in the first embodiment, and therefore a detailed description thereof is omitted. The second embodiment, however, aims at correcting the difference between the actual velocity of the optical head 3 and the detected velocity, as shown in FIG. 12.

Figure 18:
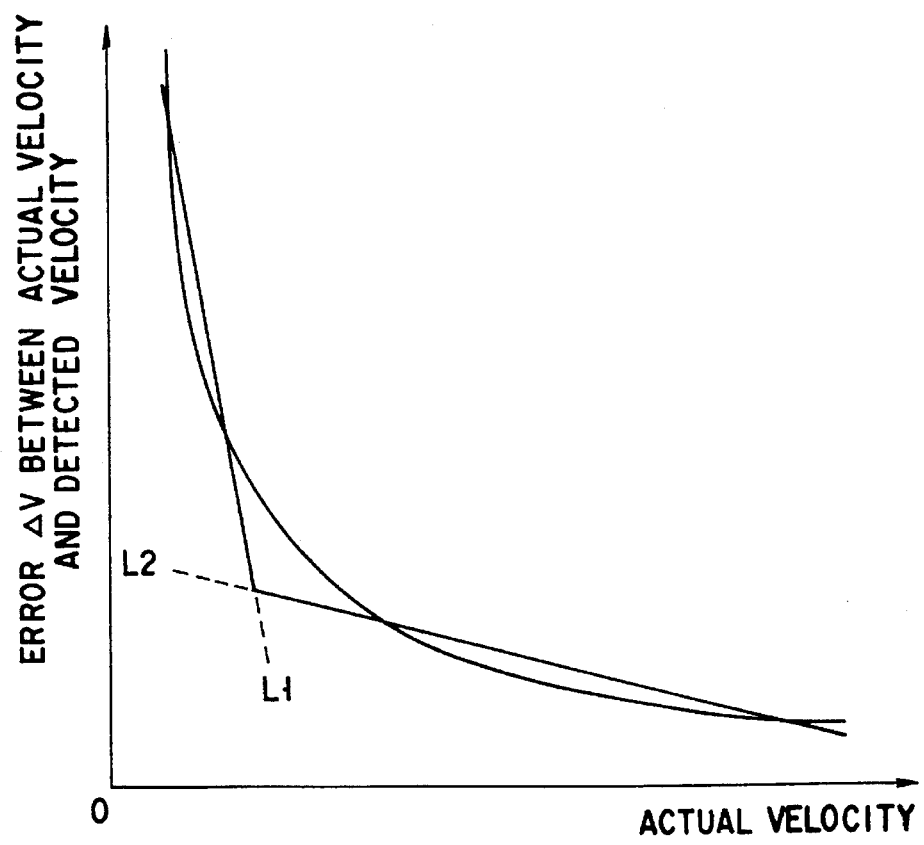
FIG. 18 is a graph showing the relationship between a difference between the actual velocity and detected velocity of the optical head, and the actual velocity of the optical head, in a second embodiment of the invention.

As is shown in FIG. 18, an error $\Delta v$ between the actual velocity of the optical head 3 and the detected velocity increases gradually, as the actual velocity of the head 3 decreases. From this, it is possible to set the predetermined value Ve as a function of velocity, on the basis of the following equations:

$$Ve = k \times Ed = (1-K) \times Ed = Ed - K \times Ed, \quad k = Ed = \Delta v$$

When the predetermined value Ve is set as a function of the error $\Delta v$ between the actual velocity and detected velocity of the optical head 3, the compensated reference velocity Vc can be calculated in the above-described optical disk system by several methods. In one method, the value a $\Delta$ as shown in FIG. 18 is read for each velocity value. From the value $\Delta v$, the value Ve is calculated and stored as a compensation value in advance. Using the compensation value, the compensated reference velocity Vc is calculated. In another method, as shown in FIG. 16, the value $\Delta v$ is approximated by using one or two straight lines (L1, L2), and formulae representing the straight lines are stored in advance. Using the straight lines, the compensated reference velocity Vc is calculated.

By controlling the predetermined value Ve in accordance with the velocity at the time of deceleration, it becomes possible to reduce the influence of the velocity detection delay, which is not conspicuous in the deceleration operation in the high-velocity region and is considerable in the deceleration operation in the low-velocity region. Thus, the optical head 3 can be driven according to the designed value.

If the compensated reference velocity Vc having such a gradient as to gradually approach the reference velocity Vr with the passage of time, as shown in FIG. 19, is stored, the actual velocity variation of the optical head 3 can be fully approached to the reference velocity Vr.

The access operation of the optical head 3 in the second embodiment is the same as that in the first embodiment described with reference to FIGS. 16 and 17, and therefore a detailed description thereof is omitted. In the second embodiment, the same advantageous effects as in the first embodiment can be obtained.

A third embodiment of the invention will now be described. The construction of the optical disk system according to the third embodiment is the same as that of the first embodiment and therefore a detailed description thereof is omitted. However, the CPU 23 has, in addition to the processing function in the first embodiment, a function of determining whether the optical head 3 is in the acceleration operation or in the deceleration operation while the velocity control is being executed.

Specifically, the CPU 23 reads out from the reference velocity table 24a the reference velocity Vr corresponding to the remaining track number each time the track cross pulse is supplied from the track counter circuit 35, and determines whether the optical head 3 is in the acceleration operation or in the deceleration operation while the velocity control is being effected. If it is determined that the head 3 is in the acceleration operation, the read-out reference velocity Vr is used as a control reference velocity. If it is determined that the head 3 is in the deceleration operation, the compensated reference velocity Vc which is lower than the designed value by predetermined value Ve is calculated by using the compensated reference velocity calculation table 24b. This compensated reference velocity Vc is used as control reference velocity and output to the linear motor control circuit 17 via the control reference velocity D/A converter 22.

A description will now be given of the method in which the CPU 23 determines whether the optical head 3 is in the acceleration operation or deceleration operation.

The CPU 23 compares the detection velocity obtained by the track counter with the reference velocity. If the detection velocity is lower, it is determined that the head 3 is in the acceleration operation. If the detection velocity is higher, it is determined that the head 3 is in the deceleration operation. In the method of determination, it may be determined that the head 3 is in the deceleration operation, if predetermined conditions are satisfied for a predetermined number of times or for a predetermined time period (e.g. the detected velocity is higher than the reference velocity) while the switching from the acceleration operation to the deceleration operation is determined. With the above structure, it is possible to exactly determine whether the head 3 is in the acceleration operation or in the deceleration operation even when the velocity detection operation is unstable. It should be noted that the predetermined number of times and the predetermined time period can be set at proper values in advance.

In another method, the CPU 23 calculates the remaining track number at which the deceleration operation is to be started, from the seek track number representing an error between the track address prior to start of seek and the appointed track address, and compares the calculated remaining track number with the current remaining track number, thereby determining whether the head 3 is in the acceleration operation or in the deceleration operation.

In the above two methods of determination, the CPU 23 may be designed to continue to output the deceleration operation signal until the seek of the optical head 3 by the head driving mechanism is completed, once the CPU 23 has determined the switching from the acceleration operation to the deceleration operation. Thereby, the velocity control operation can be prevented from becoming unstable due to instability in the velocity detection or track count operation or due to noise.

On the other hand, as shown in FIG. 11, immediately after the start of deceleration during seek, the velocity of head 3 approaches the designed velocity Vr gradually. In other words, the seek time increases since the velocity at this time is inevitably lower than the designed velocity.

In the case of short-time seek which is completed in such a short time period as to be needed to approach the designed velocity, the head 3 reaches the appointed track at a velocity lower than the designed velocity. Consequently, the seek may possibly fail due to influence of eccentricity of the disk.

In order to solve the above problems, the third embodiment adopts a velocity control method wherein the reference velocity Vr or the designed value is used during the acceleration operation and the compensated reference velocity Vc is used only in the deceleration operation.

Specifically, in FIG. 20, the designed reference velocity Vr is used as a target value during the acceleration operation. When the actual velocity has agreed with the reference velocity Vr, the deceleration operation is initiated with the compensated reference velocity Vc used as a target value in the deceleration operation.

Thus, the optical head 3 reaches the designed velocity at the time of start of deceleration, and the head 3 can be moved according to the design.

The seek operation of the optical head 3 in the third embodiment will now be described with reference to flow charts of FIGS. 21 to 26 illustrating various control methods.

Figure 21:
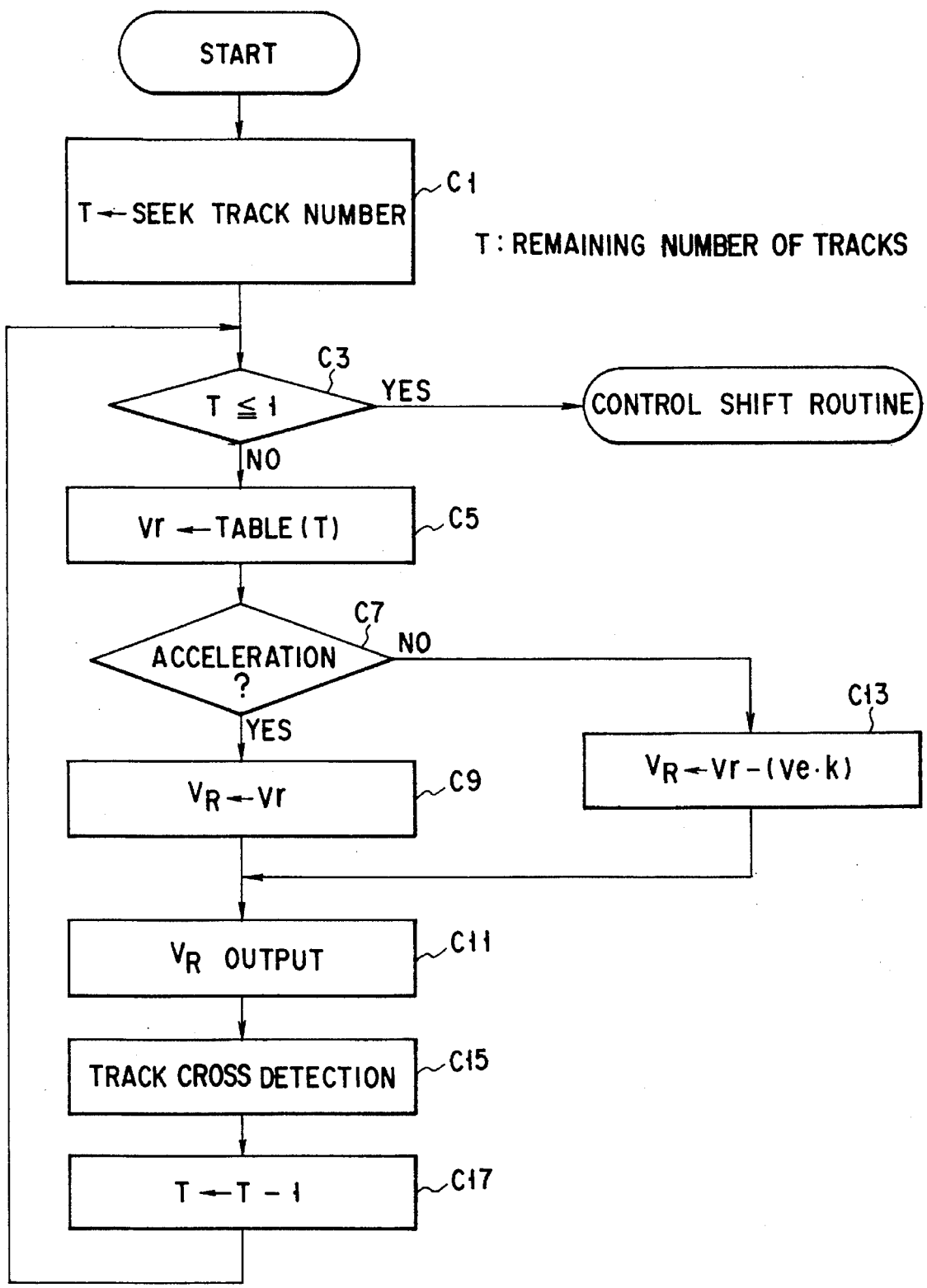
FIG. 21 is a flow chart illustrating the operation of a first example of the third embodiment of the invention.

At first, an operation according to a first control method will now be described with reference to the flow chart of FIG. 21. The track address of the target position or seek position of the optical head 3 is supplied from the optical disk control device 33 to the CPU 23 via the interface circuit 32 and bus 20. The track address representing the track at which the optical head 3 is located is supplied from the signal processing circuit 19 to the CPU 23. The track address representing the current position of the optical head 3 may be stored, where necessary, at a predetermined location in the memory 24 at the time of information recording/reproducing and may be utilized.

At the time of start of access, the CPU 23 calculates the seek track number representing the difference between the track address of the target position and the current track address. The seek track number T is stored in the counter circuit 59 as an initial value of the remaining track number (step C1).

The CPU 23 carries out various processes of the seek control routine.

The CPU 23 determines whether or not the remaining track number T is 1 or less. If the remaining track number 1 is not 1 or less (NO in step C3), the CPU 23 reads out the reference velocity Vr corresponding to the remaining track number from the reference velocity table 24a (step C5). Thereafter, the CPU 23 determines whether the optical head 3 is in the acceleration operation (step C7). If the optical head 3 is in the acceleration operation, the reference velocity Vr read out from the reference velocity table 24a is output as a control reference velocity (steps C9 and C11). If the head 3 is in the deceleration operation, the compensated reference velocity Vc lower by a predetermined value Ve of the read-out reference velocity is calculated by using the compensated reference velocity table 24b and output as a control reference velocity (steps C13 and C11). The reference velocity Vr or compensated reference velocity Vc is converted to an analog signal by the D/A converter 22d and output to the linear motor control circuit 17.

The CPU 23 determines the seek direction of the optical head 3 from the track address of the target position and the current track address, and outputs the result of determination to the linear motor control circuit 17 and track counter circuit 35.

Thus, the linear motor control circuit 17 applies to the driving coil 13 of the linear motor 31 a voltage corresponding to the difference between the control reference velocity supplied from the CPU 23 and the detected velocity of the optical head 3 supplied from the track counter circuit 35. Thereby, the linear motor 31 is driven and the optical head 3 is moved to the target position.

Thereafter, the counter circuit 59 counts up/down the remaining track number in accordance with the track cross pulse supplied each time the laser beam from the head 3 has crossed over the track and the direction signal sent from the direction detection circuit 58 (steps C15 and C17). After step C17, the CPU 23 returns to the process of step C3 and executes the processing of steps C5 to C17 until the remaining track number decreases to 1 or less.

In step C3, if the remaining track number T is 1 or less (YES in step C3), the CPU 23 carries out the control shift routine for effecting position control (tacking control), etc.

In the above operation, the count up/down is performed in units of a track. However, in a track detection system wherein several tracks are detected at a time, the detected track number may be counted up/down at a time.

In the above operation, if the remaining track number T decreases to 1 or less, the control shift routine is executed. However, for example, the cross of the beam over the track may be detected more finely, and the tracking process may be executed when the remaining track number T has decreased to 0.5 or less.

After the above operation, the position control is executed, and the recording/reproducing of information is effected on the accessed track.

Specifically, in the operation according to the first control, the reference velocity Vr corresponding to the number of remaining tracks to the target position of the optical head 3 is stored in the table 24a. When the optical head 3 is moved, the CPU 23 reads out from the table 24a the reference velocity vr corresponding to the number of remaining tracks between the current position of the optical head and the target position, and furthermore the CPU 23 determines whether the optical head 3 is in the acceleration operation or in the deceleration operation. If the optical head 3 is in the acceleration operation, the reference velocity Vr read out from the table 24a is used as a control reference velocity. If the head 3 is in the deceleration operation, the compensated reference signal Vc obtained by compensating the read-out reference velocity Vr by the compensation means is used as a control reference velocity. On the basis of the control reference velocity, the velocity of the optical head 3 is controlled.

The operations according to second to sixth control methods will now be described with reference to flow charts. A description of the processing over-lapping the operation according to the first control method is omitted.

When each of the following control methods is adopted, the kinds of reference velocities stored in the tables 24a and 24b of the memory 24 need to be set properly.

The operation according to the second control method is illustrated in the flow chart of FIG. 22. The second control method differs from the first control method in the following steps. The CPU 23 reads out from the table 24a of the memory 24 the reference velocity Vr corresponding to the remaining track number (step D5). Then, the compensated reference velocity Vc is calculated from the read-out reference velocity Vr (step D7). Thereafter, the CPU 23 selects one of the reference velocity Vr or compensated reference velocity Vc, depending on whether the optical head 3 is in the acceleration operation or in the deceleration operation (step D11 or step D19).

Specifically, in the second control method, the reference velocity Vr corresponding to the number of remaining tracks to the appointed track of the optical head is stored in the table 24a of the memory 24. When the optical head 3 is moved, the CPU 23 reads out from the table 24a the reference velocity Vr corresponding to the number of remaining tracks between the current position of the optical head 3 and the target position. Further, the CPU 23 compensates the read-out reference velocity Vr and obtains the compensated reference velocity Vc. In addition, the CPU 23 determines whether the optical head 3 is in the acceleration operation or in the deceleration operation. If the head 3 is in the acceleration operation, the read-out reference velocity Vr is used as a control reference velocity. If the head 3 is in the deceleration operation, the compensated reference velocity Vc is used as a control reference velocity. Thus, the velocity of the optical head 3 is controlled.

Figure 23:
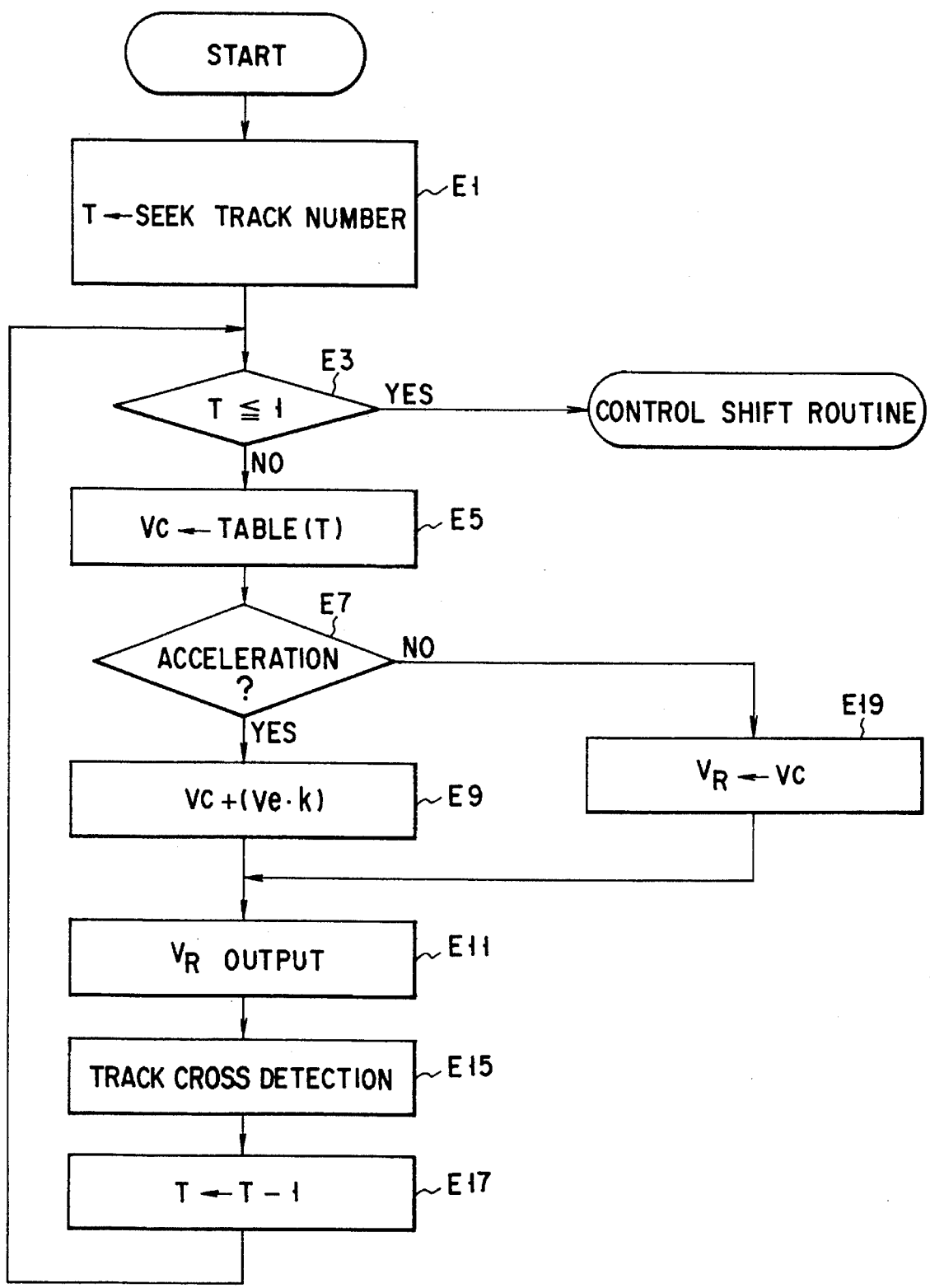
FIG. 23 is a flow chart illustrating the operation of a third example of the third embodiment of the invention.

FIG. 23 illustrates the operation according to the third control method. The third control method differs from the first and second control methods in the following steps. The table 24a of the memory 24 stores the compensated reference velocity Vc in advance, which is obtained by compensating the reference velocity Vr. The CPU 23 reads out the compensated reference velocity Vc from the table 24a in accordance with the remaining track number (step E5). Furthermore, when the optical head 3 is in the acceleration operation, the CPU 23 adds the predetermined value Ve to the compensated reference velocity Vc, thereby compensating the velocity once again. This re-compensated velocity is utilized for velocity control (steps E9 and E11). If the optical head 3 is in the deceleration operation, the compensated reference velocity Vc is used as it is (steps E19 and E11).

Specifically, in the third control method, the table 24a of the memory 24 stores the compensated reference velocity Vc obtained by compensating the reference velocity Vr corresponding to the number of remaining tracks to the target position of the optical head 3. When the optical head 3 is moved, the CPU 23 reads out from the table 24a the compensated reference velocity Vc corresponding to the number of remaining tracks between the current position and target position of the optical head 3, and determines whether the head 3 is in the acceleration operation or in the deceleration operation. If the optical head 3 is in the acceleration operation, the read-out compensated reference velocity Vc is inversely compensated (by adding the predetermined value Ve to the compensated reference velocity Vc) to obtain the control reference velocity. If the head 3 is in the deceleration operation, the read-out compensated reference velocity Vc is used as control reference velocity to control the velocity of the optical head 3.

Figure 24:
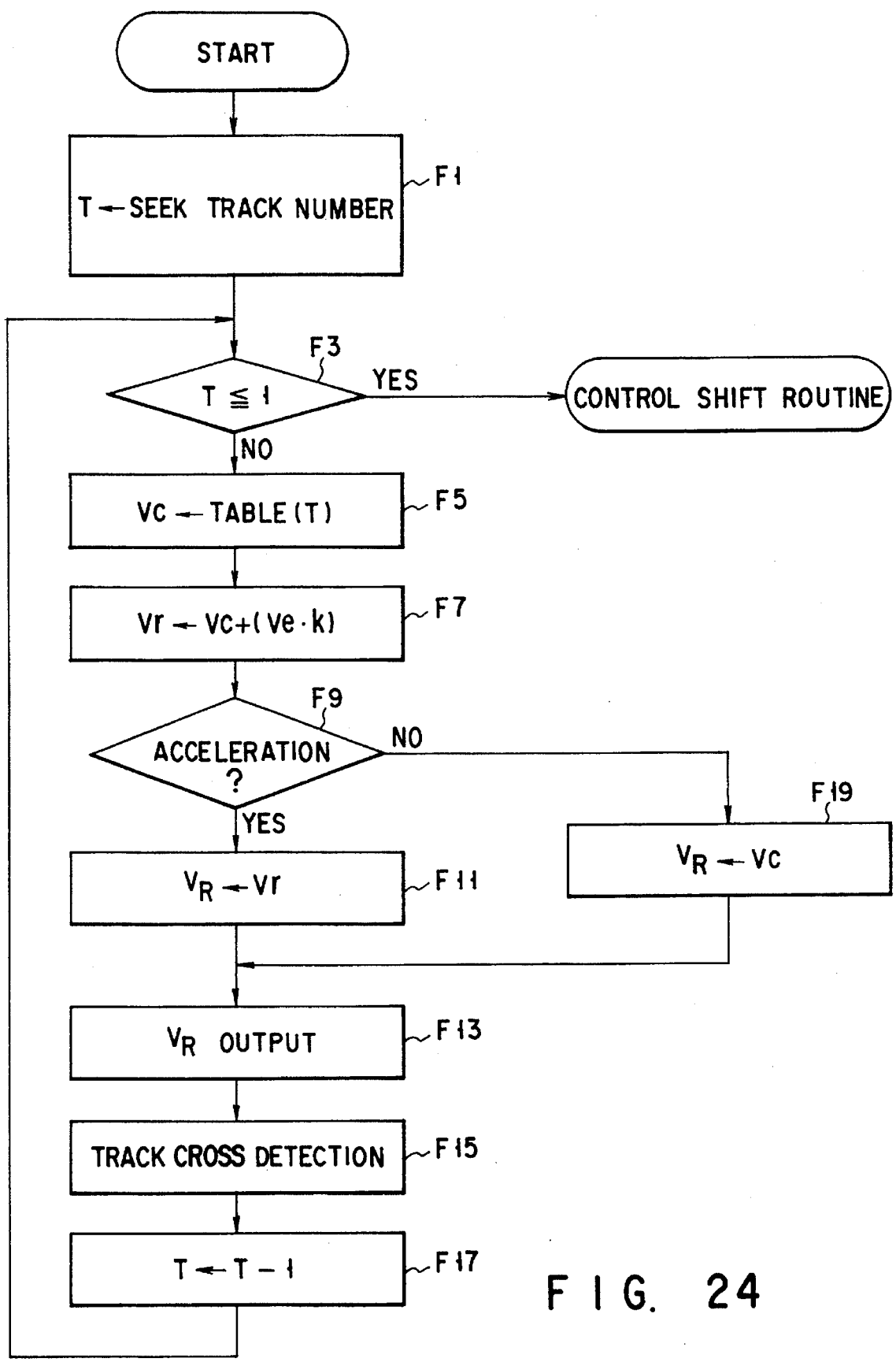
FIG. 24 is a flow chart illustrating the operation of a fourth example of the third embodiment of the invention.

FIG. 24 illustrates the operation according to the fourth control method. The fourth control method differs from each of the preceding methods in the following steps. As with the case of applying the third control method, the table 24a of the memory 24 stores the compensated reference velocity Vc obtained by compensating the reference velocity Vr. The CPU 23 reads out the compensated reference velocity Vc corresponding to the number of remaining tracks to the appointed track and adds the predetermined value Ve to the compensated reference velocity vc (steps F5 and F7). In this operation, the compensated reference velocity Vc is re-compensated to obtain the reference velocity Vr. When the optical head 3 is in the acceleration operation, the CPU 23 uses the re-compensated reference velocity Vr (steps F11 and F13). If the head 3 is in the deceleration operation, the velocity control is effected by using the compensated reference velocity Vc (steps F19 and F13).

Specifically, in the fourth control method, the table 24a of the memory 24 stores the compensated reference velocity Vc obtained by compensating the reference velocity Vr corresponding to the number of remaining tracks to the target position of the optical head 3. When the optical head 3 is moved, the CPU 23 reads out from the table 24a of the memory 24 the compensated reference velocity Vc corresponding to the number of remaining tracks between the current position and target position of the optical head 3. By inversely compensating the read-out compensated reference velocity Vc, the CPU 23 obtains the inverse compensated reference velocity (reference velocity) Vr. Furthermore, the CPU 23 determines whether the optical head 3 is in the acceleration operation or in the deceleration operation. If the head 3 is in the acceleration operation, the inversely compensated reference velocity Vr is used as a control reference velocity. If the head 3 is in the deceleration operation, the compensated reference velocity Vc is used as control reference velocity to control the velocity of the optical head 3.

FIG. 25 illustrates the operation according to the fifth control method. The fifth control method differs from each of the preceding methods in the following steps. The table 24a of the memory 24 stores the reference velocity Vr corresponding to the number T of remaining tracks to the appointed track, and the table 24b stores the compensated reference velocity Vc obtained by compensating the reference velocity Vr. When the remaining track number T is greater than 1 (NO in step G3), the CPU 23 refers to the tables 24a and 24b and reads out the reference velocity Vr corresponding to the remaining track number T and compensated reference velocity Vc (steps G5 and G7). Furthermore, when the optical head 3 is in the acceleration operation, the reference velocity Vr is used (steps G11 and G13). When the optical head 3 is in the deceleration operation, the optical head 3 is controlled on the basis of the compensated reference velocity Vc (steps G19 and G13).

Specifically, in the fifth control method, the table 24a stores the reference velocity Vr corresponding to the number of remaining tracks to the target position of the head 3, and the table 24b stores the compensated reference velocity Vc obtained by compensating the reference velocity Vr. When the optical head 3 is moved, the CPU 23 reads out from the tables 24a and 24b the reference velocity Vr corresponding to the number of remaining tracks between the current position and target position of the head 3 and the compensated reference velocity Vc. Furthermore, the optical head 3 determines whether the optical head 3 is in the acceleration operation or in the deceleration operation. If the head 3 is in the acceleration operation, the reference velocity Vr is used as a control reference velocity. If the head 3 is in the deceleration operation, the compensated reference velocity Vc is used as a control reference velocity. Thus, the velocity of the head 3 is controlled.

Figure 26:
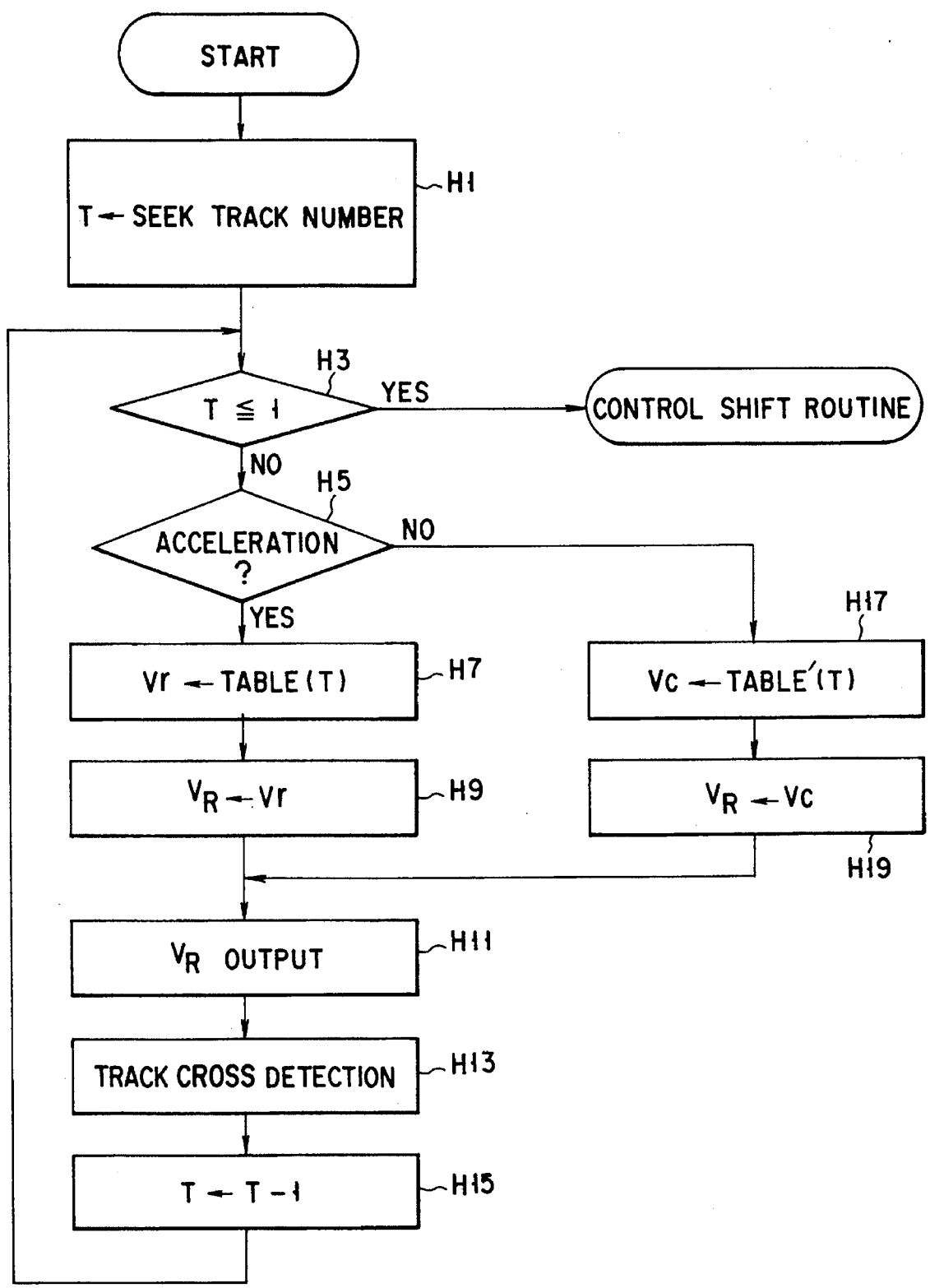
FIG. 26 is a flow chart illustrating the operation of a sixth example of the third embodiment of the invention.

FIG. 26 illustrates the operation according to the sixth control method. As with the fifth control method, the reference velocity Vr corresponding to the remaining track number T is stored in the table 24a in advance, and the compensated reference velocity Vc is stored in the table 24b in advance. The sixth control method differs from each of the preceding methods in the following steps. The CPU 23 determines, at first, whether the optical head 3 is in the acceleration operation or in the deceleration operation (step H5). Depending on whether the head 3 is in the acceleration operation or in the deceleration operation, the CPU 23 reads out the reference velocity Vr or Vc corresponding to the remaining track number T from the table 24a or 24b (steps H7 or H17).

Specifically, in the sixth control method, the table 24a stores the reference velocity Vr corresponding to the number of remaining tracks to the target position of the head 3, and the table 24b stores the compensated reference velocity Vc obtained by compensating the reference velocity Vr. When the optical head 3 is moved, the CPU 23 determines whether the optical head 3 is in the acceleration operation or in the deceleration operation. If the head 3 is in the acceleration operation, the reference velocity Vr is used as a control reference velocity. If the head 3 is in the deceleration operation, the compensated reference velocity Vc is used as a control reference velocity. Thus, the velocity of the head 3 is controlled.

In each of the above control methods, as shown in FIG. 20, while the optical head 3 is in the acceleration operation, the designed value is used as a control reference velocity Vr and the compensated reference velocity Vc is used only in the deceleration operation.

A fourth embodiment of the optical disk system of the present invention will now be described.

Figure 27:
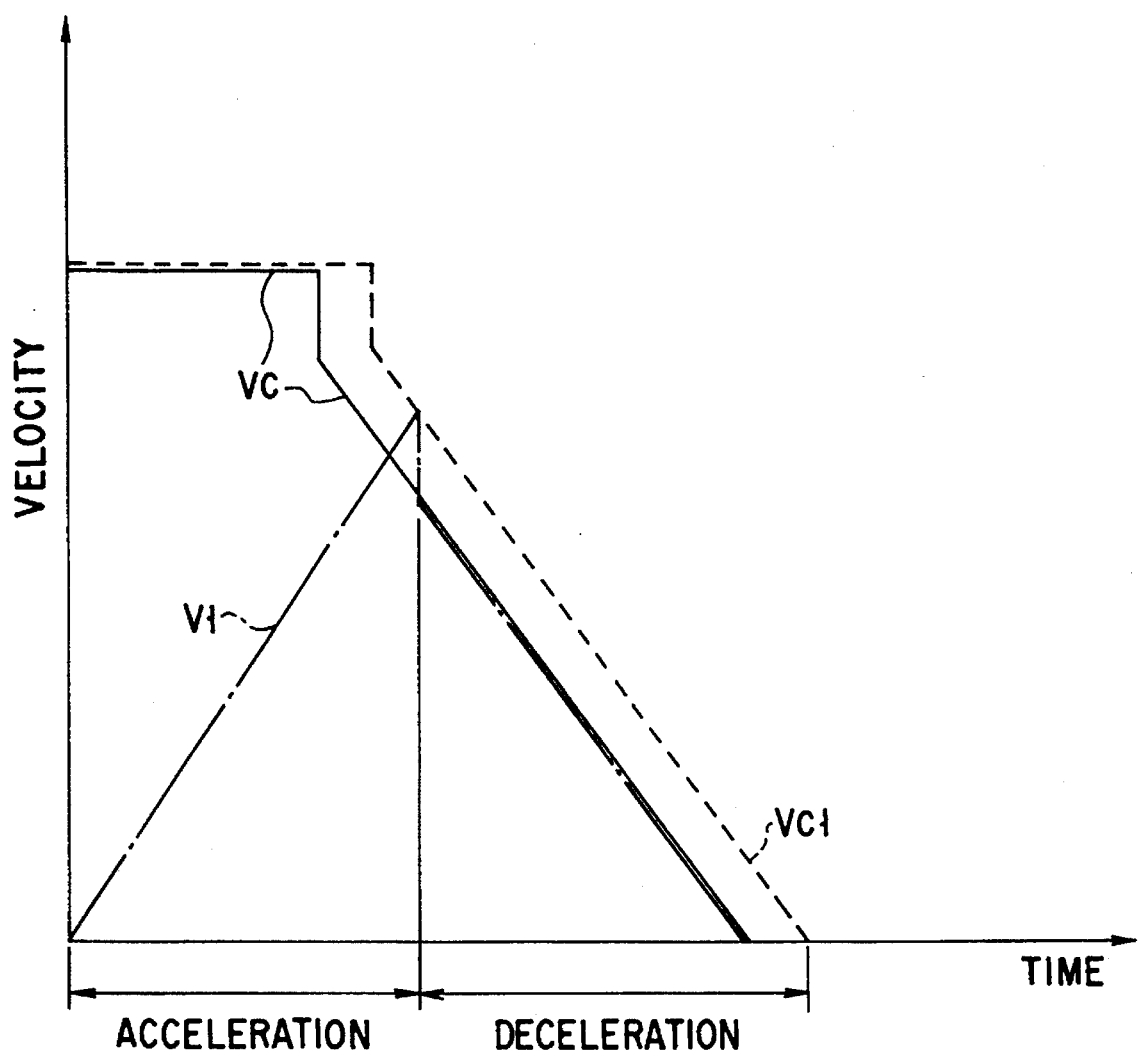
FIG. 27 is a graph showing the relationship between a difference between the actual velocity and detected velocity of the optical head, and the actual velocity of the optical head, in a fourth embodiment of the optical disk apparatus of the invention.

In the fourth embodiment, as shown in FIG. 27, the remaining track number T is increased by a predetermined number of tracks in the acceleration operation and set at a remaining track number for control (track number compensation value Tc). The velocity control is effected by using the compensated reference velocity Vc corresponding to the remaining track number for control. In the deceleration operation, the compensated reference velocity Vc corresponding to the correct remaining track number is used.

Specifically, as shown in the graph of FIG. 27, the compensated reference velocity is displaced to the right in the graph (towards greater values on time axis). This operation has the same effect as in the case of increasing the target value by a proper number of tracks. The remaining track number is compensated so that the compensated reference velocity Vc corresponding to the compensated remaining track number becomes greater than the compensated reference velocity Vc corresponding to the non-compensated remaining track number by the predetermined value Ve. Specifically, it is possible to achieve the same effect as in the case where the compensated reference velocity, which is higher by about predetermined value Ve than the compensated reference velocity Vc corresponding to the correct remaining track number, is provided. With such an apparent technique, the velocity control corresponding to the acceleration operation can be performed.

Thus, the velocity of the optical head 3 reaches the designed velocity at the time of start of deceleration. In the acceleration operation, the head 3 can be moved according to the design.

At this time, it is necessary to store in the track number compensation table 24b the information for calculating a predetermined value for increasing the remaining track number. The format of the information stored in the track number compensation table 24b may be a table storing the compensation value TC corresponding to the seek track number from the track associated with the seek start time point to the appointed track, or may be an arithmetic formula for calculating a predetermined value.

As with the first embodiment, the reference compensation coefficient Vc represents a velocity obtained by using the steady state error depending on the information processing system and the compensation coefficient k. As mentioned above, it is desirable that the compensation coefficient k be 0.75 or more and less than 1.

The seek operation of the optical head 3 in the case of effecting velocity control as illustrated in FIG. 27 will now be described with reference to the flow charts of FIGS. 28 to 31.

Figure 28:
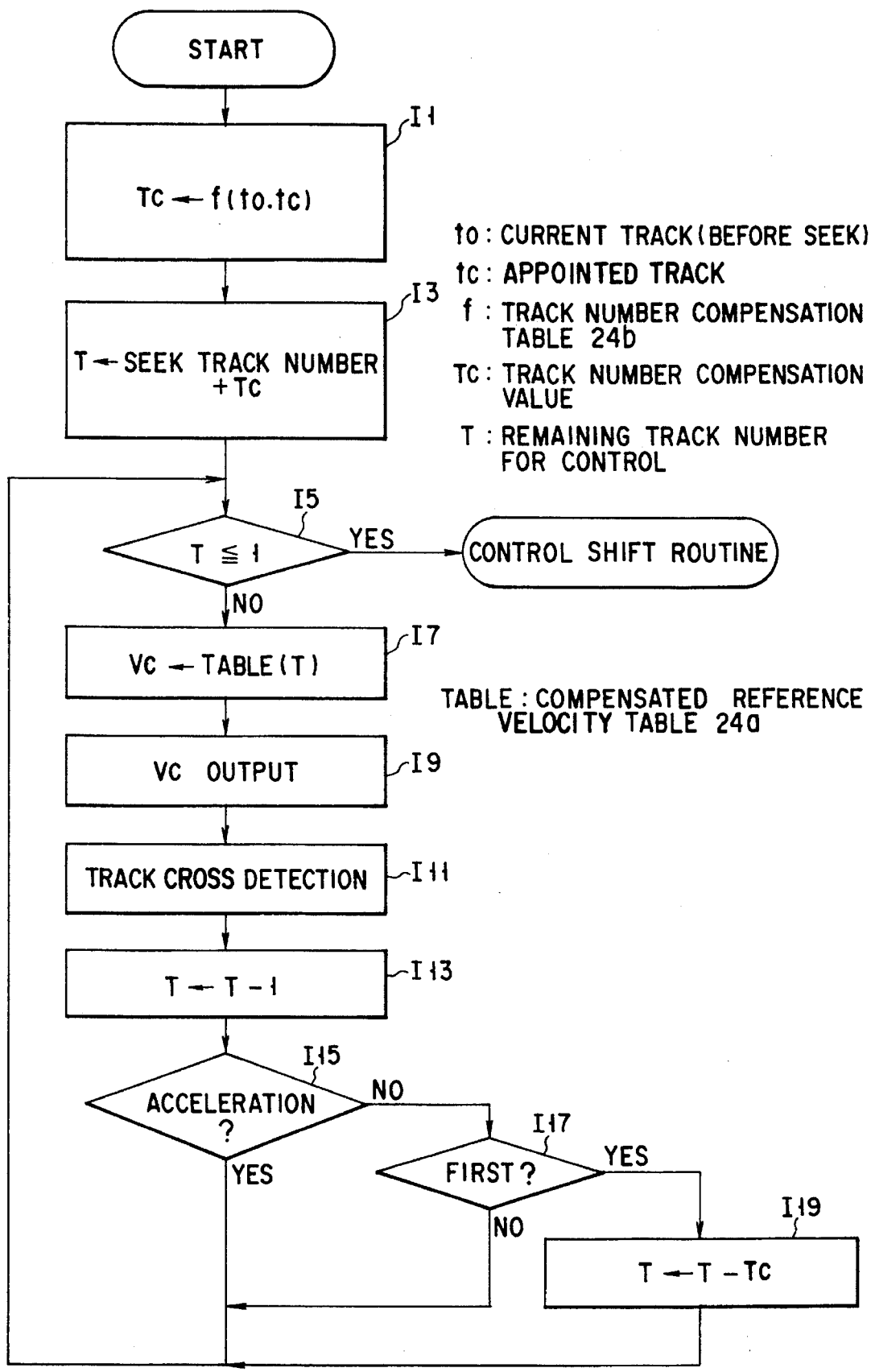
FIG. 28 is a flow chart illustrating the operation of a first example of a fourth embodiment of the invention.

At first, the velocity control operation according to a seventh control method will now be described with reference to the flow chart of FIG. 28. Suppose that the table 24a of the memory 24 stores the compensated reference velocity Vc corresponding to the remaining track number for control.

The CPU 23 calculates an initial value of the remaining track number T for control by using a seek track number which is a difference between the track address of the target position and the current track address. If the format of data stored in the track number compensation table 24b is a table storing a predetermined value Tc corresponding to the seek track number, the CPU 23 adds the predetermined value Tc to the difference (seek track number) between the track address of the target position and the track address of the current track position, thereby obtaining the remaining track number T for control (steps I1 and I3). If the table 24b stores the arithmetic formula for calculating the predetermined value, the CPU 23 calculates the remaining track number T for control according to the arithmetic formula. The remaining track number T for control is sent to the counter circuit 59 and stored.

Thereafter, the CPU 23 executes the seek process routine.

The CPU 23 checks whether or not the remaining track number is 1 or less. If the remaining track number is 1 or less (YES in step I5), the seek routine is completed and the control shift routine for executing the position control (tracking control) is executed. If the remaining track number is not 1 or less (NO in step I5), the compensated reference velocity Vc corresponding to the remaining track number for control is read out from the compensated reference velocity table 24a (step I7). Further, the CPU 23 outputs the read-out compensated reference velocity Vc as a control reference velocity (step I9). The output compensated reference velocity Vc is converted to the analog signal by the D/A converter 22 and sent to the linear motor control circuit 17.

The CPU 23 determines the direction of movement of the optical head 3 from the track address of the target position and the current track address, and outputs the result of determination to the linear motor control circuit 17 and track counter circuit 35.

Thus, the linear motor control circuit 17 applies to the driving coil 13 of the linear motor 31 a voltage corresponding to the difference between the control reference velocity (compensated reference velocity Vc) supplied from the CPU 23 and the detected velocity of the optical head 3 supplied from the track counter circuit 35. Thereby, the linear motor 31 is driven and the optical head 3 is moved to the target position.

Thereafter, the counter circuit 59 counts up/down the remaining track number in accordance with the track cross pulse supplied each time the laser beam from the head 3 has crossed over the track and the direction signal sent from the direction detection circuit 58 (steps I11 and I13). If the counting up/down of the remaining track number is finished, the CPU 23 determines whether or not the optical head 3 is in the acceleration operation (step I15). If the optical head 3 is in the acceleration operation (YES in step I15), the CPU 23 returns to step I5 of determining whether or not the remaining track number is 1 or less.

If the optical head 3 is not in the acceleration operation (NO in step I15), the CPU 23 determines whether the result of determination obtained in step I15, to the effect that the head 3 is not in the acceleration operation, is a result of first determination (step I17). If the determination result in step I15 that the head 3 is not in the acceleration operation is not the first result of determination (NO in step I17), the CPU 23 returns to the process of determining whether or not the remaining track number is 1 or less. If the determination result in step I15 that the head 3 is not in the acceleration operation is the first result of determination (YES in step I17), the CPU 23 subtracts the predetermined compensation value Tc from the remaining track number T and stores the result of subtraction in the counter circuit 59 as a new track number T. Thereafter, the CPU 23 returns to step I5.

By the determination process of step I17, the remaining track number T is compensated in step I19 only when it is first detected that the head 3 is not in the acceleration operation, i.e. only when the acceleration operation is switched to the deceleration operation.

Through the above process, the optical head 3 can be moved to the appointed track at a proper velocity.

Although the counting up/down is effected in units of one track, a detected track number may be counted up/down at a time in a velocity detection system in which several tracks are detected at a time.

In the operation according to the seventh control method, the memory 24 stores the compensated reference velocity Vc obtained by compensating the reference velocity Vr corresponding to the number of remaining tracks to the target position (appointed track) of the optical head 3. When the optical head 3 is moved, a track number based on a predetermined arithmetic formula or a table is added to the number of tracks between the position of the head 3 before seek and the target position, thus obtaining a new remaining track number T (remaining track number for control). Each time the optical head 3 has crossed over the track, the CPU 23 subtracts a cross track number from the remaining track number for control. When the operation of the optical head 3 has switched from the acceleration operation to the deceleration operation, the predetermined track number Tc is subtracted from the remaining track number T to obtain a new remaining track number T (remaining track number for control). Subsequently, the CPU 23 reads out from the memory 24 the compensated reference velocity Vc corresponding to the new remaining track number T (remaining track number for control). Using the compensated reference velocity Vc as control reference velocity, the CPU 23 controls the seek velocity of the head 3.

The operations according to eighth to tenth control methods will now be described with reference to the flow charts of FIGS. 29 to 31. However, a description of the operations overlapping those according to the seventh control method is omitted.

Figure 29:
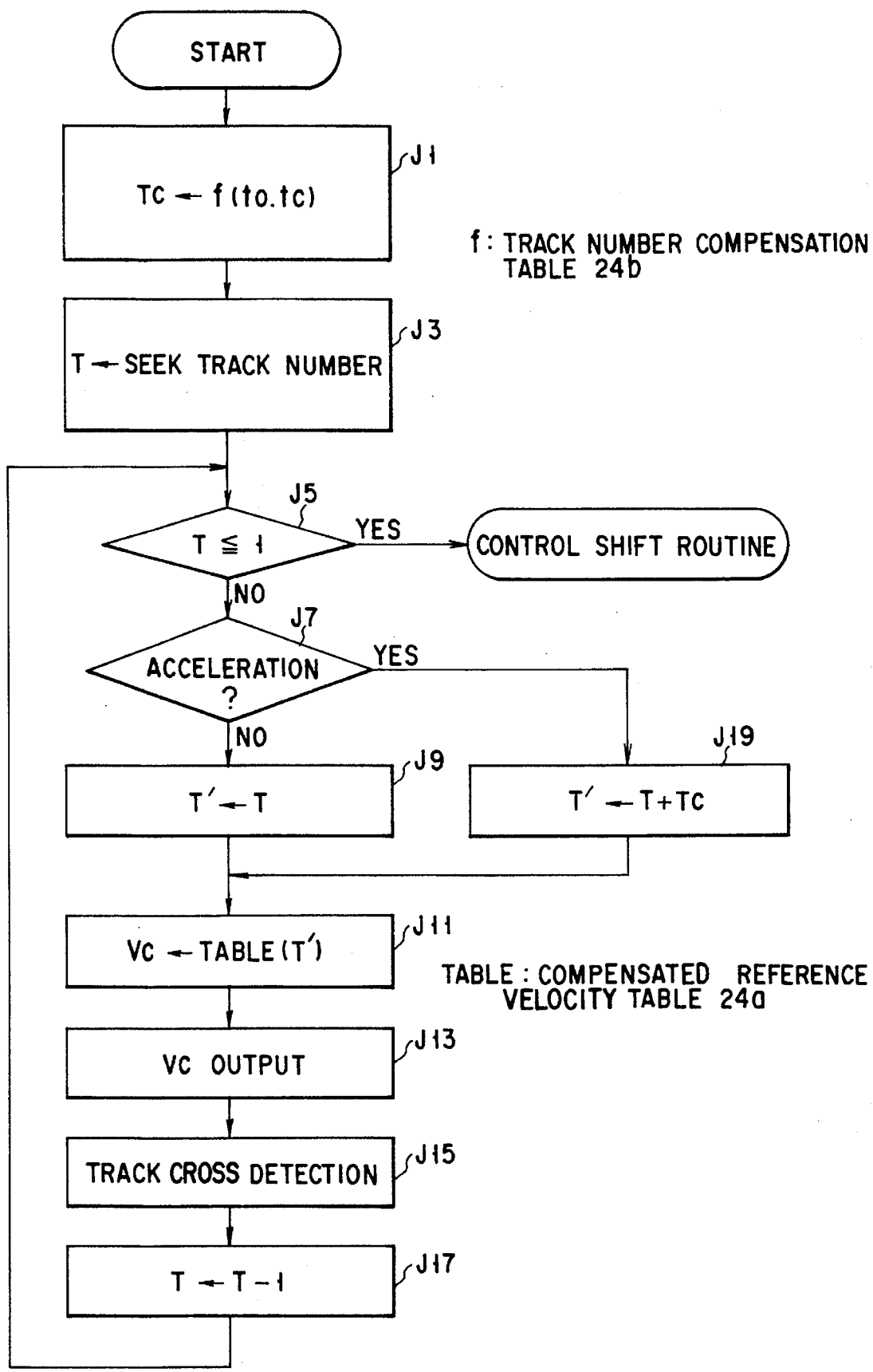
FIG. 29 is a flow chart illustrating the operation of a second example of the fourth embodiment of the invention.

FIG. 29 shows the operation according to the eighth control method. The eighth control method differs from the seventh control method in that the memory 24 stores in advance the track number compensation value Tc corresponding to the remaining track number, and this track number compensation value Tc is added only when the head 3 is in the acceleration operation (step J19).

Specifically, in the eighth control method, the memory 24 stores the compensated reference velocity Vc obtained by compensating the reference velocity Vr corresponding to the number of remaining tracks to the target position (appointed track) of the optical head 3. When the optical head 3 is moved, if the head 3 is in the acceleration operation, a predetermined track number is added to the number of tracks between the current position and target position of the head 3, thereby obtaining a new remaining track number (remaining track number for control). If the optical head 3 is in the deceleration operation, the number of tracks between the current position and target position of the head 3 is used directly as a remaining track number for control. The CPU 23 reads out from the memory 24 the compensated reference velocity Vc corresponding to the remaining track number for control and controls the seek velocity of the head 3 by using the compensated reference velocity Vc as a control reference velocity.

FIG. 30 illustrates the operation according to the ninth control method. In this method, the table of the memory 24 stores in advance the reference velocity Vr corresponding to the remaining track number. The ninth control method differs from each of the above control methods in that a predetermined track number is subtracted only once from the remaining track number for control when the deceleration operation is initiated (step K17). The CPU 23 effects control with the result of subtraction used as the remaining track number for control.

Specifically, in the operation according to the ninth control method, the memory 24 stores in advance the reference velocity Vr corresponding to the number of remaining tracks to the target position of the optical head 3. When the optical head 3 is moved, the number of tracks between the pre-seek position and target position of the head 3 is used as a remaining track number for control, and the cross track number is subtracted from the remaining track number for control each time the beam from the head has crossed over the track. When the operation of the head 3 is switched from the acceleration operation to the deceleration operation, a predetermined track number is subtracted from the remaining track number for control to obtain a new remaining track number for control. The CPU 23 reads out from the memory 24 the reference velocity Vr corresponding to the new remaining track number for control and controls the seek velocity of the head 3 by using the reference velocity Vr as a control reference velocity.

FIG. 31 illustrates the operation according to the tenth control method. In this operation, the table 24a of the memory 24 stores in advance the reference velocity (designed value) corresponding to the remaining track number and the table 24b of the memory 24 stores in advance the track number compensation value Tc corresponding to the remaining track number. The tenth control method differs from each of the preceding control methods in that the track number compensation value Tc is subtracted from the remaining track number T only when the optical head 3 is in the deceleration operation (step L9).

Specifically, in the operation according to the tenth control method, the table 24a of the memory 24 stores the reference velocity corresponding to the number of remaining tracks to the target position of the optical head 3. When the optical head 3 is moved, if the head 3 is in the acceleration operation, the number of tracks between the current position and target position of the optical head 3 is used as a control remaining track number. If the head 3 is in the deceleration operation, a predetermined track number is subtracted from the number of tracks between the current position and target position of the optical head 3, and the result of subtraction is used as a control remaining track number. The CPU 23 reads out from the table 24a the reference velocity corresponding to the control remaining track number and controls the seek velocity of the head 3 by using this reference velocity as a control reference velocity.

According to the above-described first to fourth embodiments, the velocity of the optical head can be exactly decelerated at the time the head has reached the appointed track. Specifically, even if the control band of the velocity control system is limited, the optical head can be driven according to substantially the same value as the designed value. When the head has reached the appointed track, the pull in to the tracking operation can be exactly performed and initiated. Accordingly, the velocity of the optical head can be increased, and the seek time of the head can be remarkably reduced.

Besides, the write/read of information on the optical disk can be quickly and exactly performed by virtue of high-velocity seek achieved by the above velocity control system. Thus, the performance of the optical disk system can be enhanced.

As has been described above in detail, according to the present invention, there is provided an information processing system wherein the pull in to the tracking control can be exactly performed and initiated at the appointed track, and the seek time of the optical head can be reduced.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing system with a recording medium including recording tracks, for reading/writing information on the recording medium, said system comprising:

condensing means for condensing light onto said recording medium;

moving means for moving said condensing means in a direction crossing said recording tracks;

velocity detection means for detecting a velocity of said condensing means moved by said moving means;

storage means for storing a position address of said condensing means before said condensing means is moved;

input means for inputting a target position address of said condensing means;

updating means for calculating a remaining number of tracks between the position address stored in said storage means and the target position address input by said input means, and updating the remaining number of tracks in accordance with movement of the condensing means crossing the recording tracks;

compensation means for compensating and outputting a compensated reference velocity corresponding to said remaining number of tracks by using a product of a steady state error depending on the information processing system and a predetermined compensation coefficient, K, based on $0.75 \leq K < 1.0$; and control means for controlling said moving means based on a difference between said compensated reference velocity and the velocity detected by said velocity detection means.

2. The information processing system according to claim 1, wherein said compensation means includes reference velocity storage means for storing reference velocities associated with the respective recording tracks, reads out from said reference velocity storage means the reference velocity corresponding to the remaining number of tracks, subtracts a product of the steady state error and the compensation coefficient from the read-out reference velocity, and outputs the result of subtraction as the compensated reference velocity.

3. The information processing system according to claim 1, wherein said compensation means includes compensated reference velocity storage means for storing compensated reference velocities associated with the respective recording tracks, and reads out from said compensated reference velocity storage means the compensated reference velocity corresponding to the remaining number of tracks.

4. The information processing system according to claim 1, wherein said compensation means compensates said reference velocity while said condensing means is being decelerated, such that said compensated reference velocity becomes closer to said reference velocity gradually in accordance with the decrease in number of the recording tracks.

5. The information processing system according to claim 4, wherein said compensation means includes a compensated reference velocity storing means for storing in a table format a compensated reference velocity determined definitively by the reference velocity corresponding to the remaining number of tracks and the velocity detected by said velocity detection means, and reads out from said compensated reference velocity storing means a compensated reference velocity corresponding to the remaining number of tracks updated by said updating means.

6. The information processing system according to claim 1, wherein said information processing system further comprises determination means for determining a switching timing for switching an acceleration operation to a deceleration operation of said condensing means moved by said moving means, and for outputting an operation signal based on a determination by the determination means, and wherein said compensation means outputs a control reference velocity corresponding to the remaining number of tracks when said operation signal represents the acceleration operation, and outputs the compensated reference velocity based on the steady state error and the predetermined compensation coefficient when the operation signal represents the deceleration operation.

7. The information processing system according to claim 6, wherein said determination means compares the velocity detected by said velocity detection means and the reference velocity corresponding to the remaining number of tracks and outputs the operation signal representing the deceleration operation when the velocity is equal to or higher than said reference velocity.

8. The information processing system according to claim 7, wherein said determination means outputs the operation signal representing the deceleration operation, when one of two conditions is satisfied, one being that a comparison result to the effect that the velocity is not less than said reference velocity remains for a predetermined time period, the other being that the remaining number of tracks is updated by said updating means more than a predetermined number of times.

9. The information processing system according to claim 6, wherein said determination means outputs the operation signal representing the deceleration operation on the basis of the remaining number of tracks between the position address stored in said storing means and the target position address input by said input means, when the remaining number of tracks updated by said updating means has reached a predetermined value.

10. The information processing system according to claim 6, wherein said determination means continues to output the operation signal representing the deceleration operation, after outputting the operation signal representing the deceleration operation, until said condensing means reaches the target position address.

11. The information processing system according to claim 6, wherein said compensation means is responsive to the operation signal representing the deceleration operation, reads out from said reference velocity storage means the reference velocity corresponding to the remaining number of tracks, subtracts a product of the steady state error and the compensation coefficient from the read-out reference velocity, and outputs the result of subtraction as said compensated reference velocity.

12. The information processing system according to claim 6, wherein said compensation means includes reference velocity storing means for storing the reference velocity corresponding to the remaining number of tracks, reads out in advance from the reference velocity storing means the reference velocity corresponding to the remaining number of tracks, outputs, in response to the operation signal representing the acceleration operation, the read-out reference velocity as the control reference velocity, and compensates, in response to the operation signal representing the deceleration operation, the read-out reference velocity in a predetermined manner, thereby generating the compensated reference velocity and outputting the compensated reference velocity as the control reference velocity.

13. The information processing system according to claim 6, wherein said compensation means includes reference velocity storing means for storing the reference velocity corresponding to the remaining number of tracks, reads out in advance from the reference velocity storing means the reference velocity corresponding to the remaining number of tracks, compensates the read-out reference velocity in a predetermined manner to generate the compensated reference velocity, outputs, in response to the operation signal representing the acceleration operation, the read-out reference velocity as a control reference velocity, and outputs, in response to the operation signal representing the deceleration operation, the generated compensated reference velocity as the control reference velocity.

14. The information processing system according to claim 6, wherein said compensation means includes compensated reference velocity storing means for storing compensated reference velocities corresponding to the remaining number of tracks, reads out in advance from the compensated reference velocity storing means the compensated reference velocity corresponding to the remaining number of tracks, compensates inversely the read-out compensated reference velocity in a predetermined manner to generate the reference velocity and output the reference velocity as a control reference velocity, and outputs the read-out compensated reference velocity as the control reference velocity in response to the operation signal representing the deceleration operation.

15. The information processing system according to claim 7, wherein said compensation means includes compensated reference velocity storing means for storing compensated reference velocities corresponding to the remaining number of tracks, reads out in advance from the compensated reference velocity storing means the compensated reference velocity corresponding to the remaining number of tracks, compensates inversely the read-out compensated reference velocity in a predetermined manner to generate the reference velocity and output the generated reference velocity as a control reference velocity in response to the operation signal representing the acceleration operation, and outputs the read-out compensated reference velocity as the control reference velocity in response to the operation signal representing the deceleration operation.

16. The information processing system according to claim 6, wherein said compensation means includes reference velocity storing means for storing reference velocities corresponding to the remaining number of tracks and compensated reference velocity storing means for storing compensated reference velocities corresponding to the remaining number of tracks, reads out in advance from the reference velocity storing means the reference velocity corresponding to the remaining number of tracks, reads out in advance from the compensated reference velocity storing means the compensated reference velocity corresponding to the remaining number of tracks, outputs the read-out reference velocity as the control reference velocity in response to the operation signal representing the acceleration operation, and outputs the read-out compensated reference velocity as the control reference velocity in response to the operation signal representing the deceleration operation.

17. The information processing system according to claim 6, wherein said compensation means includes reference velocity storing means for storing reference velocities corresponding to the remaining number of tracks and compensated reference velocity storing means for storing compensated reference velocities corresponding to the remaining number of tracks, reads out from the reference velocity storing means the reference velocity corresponding to the remaining number of tracks in response to the operation signal representing the acceleration operation, outputs the read-out reference velocity as the control reference velocity, reads out from the compensated reference velocity storing means the compensated reference velocity corresponding to the remaining number of tracks in response to the operation signal representing the deceleration operation, and outputs the read-out compensated reference velocity as the control reference velocity.

18. An information processing system with a recording medium including recording tracks, for reading/writing information on the recording medium, said system comprising:

condensing means for condensing light on said recording medium;

moving means for moving said condensing means in a direction crossing said recording tracks;

velocity detection means for detecting a velocity of said condensing means moved by said moving means;

storage means for storing a position address of said condensing means before said condensing means is moved;

input means for inputting a target position address of said condensing means;

determination means for determining a switching timing for switching an acceleration operation to a deceleration operation of said condensing means moved by said moving means, and outputting an operation signal in accordance with a result of the determination;

track number compensation means for calculating a remaining number of tracks between the position address stored in said storage means and the target position address input by said input means, and outputting a control track number obtained by compensating said remaining number of tracks based on the operation signal;

control velocity output means for compensating and outputting a control velocity corresponding to said control track number by using a product of a steady state error depending on the information processing system and a predetermined compensation coefficient, K, based on $0.75 \leq K < 1.0$; and control means for controlling said moving means based on a difference between the control velocity and the velocity detected by said velocity detection means.

19. The information processing system according to claim 18, wherein said determination means compares the velocity detected by said velocity detection means and the reference velocity corresponding to the remaining number of tracks and outputs the operation signal representing the deceleration operation when the velocity is equal to or higher than said reference velocity.

20. The information processing system according to claim 19, wherein said determination means outputs the operation signal representing the deceleration operation, when one of two conditions is satisfied, one being that a comparison result to the effect that the velocity is not less than said reference velocity remains for a predetermined time period, the other being that the remaining number of tracks is updated by said updating means more than a predetermined number of times.

21. The information processing system according to claim 18, wherein said determination means outputs the operation signal representing the deceleration operation on the basis of the remaining number of tracks between the position address stored in said storing means and the target position address input by said input means, when the remaining number of tracks updated by said updating means has reached a predetermined value.

22. The information processing system according to claim 18, wherein said control velocity output means includes compensated reference velocity data storing means for storing a compensated reference velocity obtained by compensating a reference velocity corresponding to the remaining number of tracks between said position address and said target position address, and outputs a compensated reference velocity corresponding to said control track number.

23. The information processing system according to claim 22, wherein said track number compensation means includes:

means for adding a compensation value to the remaining number of tracks before said moving means moves said condensing means;

means for updating said remaining number of tracks in accordance with the crossing of the condensing means over the recording tracks during the movement of the condensing means; and means for updating and compensating the remaining number of tracks by subtracting the compensation value corresponding to the remaining number of tracks from said remaining number of tracks, when the operation signal representing the acceleration operation has been switched to the operation signal representing the deceleration operation.

24. The information processing system according to claim 22, wherein said track number compensation means includes updating means for updating said remaining number of tracks in accordance with the crossing of the condensing means over the recording tracks during the movement of the condensing means, and outputs, in response to the operation signal representing the acceleration operation, a track number obtained by adding a compensation value corresponding to the remaining number of tracks to said remaining number of tracks as the control track number.

25. The information processing system according to claim 18, wherein said control velocity output means includes reference velocity data storing means for storing a reference velocity corresponding to the remaining number of tracks between said position address and said target position address, and outputs the reference velocity corresponding to said control track number as a control velocity.

26. The information processing system according to claim 25, wherein said track number compensation means includes:

means for updating said remaining number of tracks in accordance with the crossing of the condensing means over the recording tracks during the movement of the condensing means; and means for updating and compensating the remaining number of tracks by subtracting a compensation value corresponding to the remaining number of tracks from said remaining number of tracks, when the operation signal representing the acceleration operation has been switched to the operation signal representing the deceleration operation.

27. The information processing system according to claim 25, wherein said track number compensation means includes updating means for updating said remaining number of tracks in accordance with the crossing of the condensing means over the recording tracks during the movement of the condensing means, and outputs, in response to the operation signal representing the deceleration operation, a track number obtained by subtracting a compensation value corresponding to the remaining number of tracks from said remaining number of tracks as the control track number.

28. A movement control method in an information processing system for reading/writing information on a recording medium, said system comprising said recording medium including recording tracks, condensing means for condensing light on said recording medium, moving means for moving the condensing means in a direction crossing the recording tracks, velocity detection means for detecting a velocity of said condensing means moved by said moving means, storage means for storing a position address of said condensing means before said condensing means is moved, and input means for inputting a target position address of said condensing means, said method comprising the steps of:

a) calculating a remaining number of tracks between the position address stored in the storage means and the target position address input by said input means, and updating the remaining number of tracks in accordance with a crossing of the condensing means over the recording tracks while the condensing means is being moved; compensating and outputting a compensated reference velocity corresponding to said remaining number of tracks by using a product of a steady state error depending on the information processing system and a predetermined compensation coefficient, K, based on $0.75 \leq K < 1.0$; and c) detecting, using said velocity detection means, the velocity of said condensing means moving by said moving means; and d) controlling said moving means based on a difference between the compensated reference velocity and the velocity detected by said velocity detection means.

29. A movement control method in an information processing system for reading/writing information on a recording medium, said system comprising said recording medium including recording tracks, condensing means for condensing light on said recording medium, moving means for moving the condensing means in a direction crossing the recording tracks, velocity detection means for detecting the velocity of said condensing means moved by said moving means, a memory for storing a position address of said condensing means before said condensing means is moved, and input means for inputting a target position address of said condensing means, said method comprising the steps of:

a) determining a switching timing for switching an acceleration operation to a deceleration operation of said condensing means moved by said moving means, and outputting an operation signal corresponding to a result of the determination;

b) calculating a remaining number of tracks between the position address stored in the storage means and the target position address input by said input means, and outputting a control track number obtained by compensating said remaining number of tracks based on said operation signal;

c) detecting, using said velocity detection means, the velocity of said condensing means moving by said moving means; and d) compensating and outputting a control velocity corresponding to said remaining number of tracks by using a product of a steady state error depending on the information processing system and a predetermined compensation coefficient, K, based on $0.75 \leq K < 1.0$; and controlling said moving means based on a difference between said control velocity and the velocity detected by said velocity detection means.

* * * * *